(12) United States Patent
Aoki et al.

(10) Patent No.: US 8,437,230 B2
(45) Date of Patent: *May 7, 2013

(54) HEAT-ASSISTED MAGNETIC WRITE HEAD, HEAD GIMBALS ASSEMBLY, HEAD ARM ASSEMBLY, AND MAGNETIC DISK DEVICE

(75) Inventors: Susumu Aoki, Tokyo (JP); Kosuke Tanaka, Tokyo (JP); Takeshi Tsutsumi, Tokyo (JP); Daisuke Miyauchi, Tokyo (JP); Tetsuya Roppongi, Tokyo (JP)

(73) Assignee: TDK Corporation, Tokyo (JP)

(*) Notice: Subject to any disclaimer, the term of this patent is extended or adjusted under 35 U.S.C. 154(b) by 232 days.

This patent is subject to a terminal disclaimer.

(21) Appl. No.: 13/030,634

(22) Filed: Feb. 18, 2011

(65) Prior Publication Data
US 2012/0213042 A1    Aug. 23, 2012

(51) Int. Cl.
G11B 11/00    (2006.01)
(52) U.S. Cl.
USPC .............. 369/13.33; 369/13.13; 369/112.27
(58) Field of Classification Search .............. 369/13.33, 369/13.32, 13.24, 13.14, 13.03, 13.02, 13.12, 369/13.13, 13.01, 13.35, 13.17, 112.27, 112.09; 360/59, 125.31, 125.74
See application file for complete search history.

(56) References Cited

U.S. PATENT DOCUMENTS

| | | | | |
|---|---|---|---|---|
| 8,077,558 B1* | 12/2011 | Tsutsumi et al. | ......... | 369/13.33 |
| 8,077,559 B1* | 12/2011 | Miyauchi et al. | ......... | 369/13.33 |
| 8,089,831 B2* | 1/2012 | Chou et al. | ......... | 369/13.33 |
| 8,116,034 B2* | 2/2012 | Komura et al. | ......... | 360/125.31 |
| 8,125,857 B2* | 2/2012 | Tanaka et al. | ......... | 369/13.33 |
| 8,125,858 B2* | 2/2012 | Hara et al. | ......... | 369/13.33 |
| 8,248,890 B2* | 8/2012 | Komura et al. | ......... | 369/13.02 |
| 8,295,132 B2* | 10/2012 | Jin et al. | ......... | 369/13.32 |
| 2007/0139818 A1 | 6/2007 | Shimazawa et al. | | |
| 2009/0168220 A1 | 7/2009 | Komura et al. | | |
| 2012/0075965 A1* | 3/2012 | Tanaka et al. | ......... | 369/13.33 |
| 2012/0075967 A1* | 3/2012 | Chou et al. | ......... | 369/13.33 |
| 2012/0213041 A1* | 8/2012 | Tanaka et al. | ......... | 369/13.33 |

FOREIGN PATENT DOCUMENTS

JP    2009-163806    7/2009

OTHER PUBLICATIONS

U.S. Appl. No. 12/710,129, filed on Feb. 22, 2010 in the name of Chou et al.
U.S. Appl. No. 12/557,078, filed on Sep. 10, 2009 in the name of Miyauchi et al.
U.S. Appl. No. 12/785,897, filed on May 24, 2010 in the name of Tsutsumi et al.

* cited by examiner

*Primary Examiner* — Ali Neyzari
(74) *Attorney, Agent, or Firm* — Oliff & Berridge, PLC

(57) ABSTRACT

A heat-assisted magnetic write head includes a magnetic pole having an end surface exposed at an air bearing surface, a waveguide extending toward the air bearing surface to propagate light, and a plasmon generator provided between the magnetic pole and the waveguide, and generating near-field light from the air bearing surface, based on the light propagated through the waveguide. The plasmon generator has an end portion exposed at the air bearing surface or located in close proximity to the air bearing surface, the end portion having a minimum thickness in a region close to the waveguide.

9 Claims, 18 Drawing Sheets

HEAT-ASSISTED MAGNETIC WRITE HEAD, HEAD GIMBALS ASSEMBLY, HEAD ARM ASSEMBLY, AND MAGNETIC DISK DEVICE

BACKGROUND OF THE INVENTION

1. Field of the Invention

The present invention relates to a heat-assisted magnetic write head used in a heat-assisted magnetic recording in which near-field light is irradiated to lower a coercivity of a magnetic recording medium so as to record information, and a head gimbals assembly, a head arm assembly, and a magnetic disk device mounted with the heat-assisted magnetic write head.

2. Description of Related Art

A magnetic disk device in the related art is used for writing and reading magnetic information (hereinafter, simply referred to as information). The magnetic disk device is provided with, in the housing thereof, a magnetic disk in which information is stored, and a magnetic read write head which records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end of a suspension, and the magnetic read write head includes a magnetic recording element and a magnetic reproducing element which have an air bearing surface (ABS) facing the magnetic disk. In particular, as the magnetic reproducing element, a magneto-resistive (MR) element exhibiting magneto resistive effect is generally used. The other end of the suspension is attached to an edge of an arm which is rotatably supported by a fixed shaft installed upright in the housing.

When the magnetic disk device is not operated, namely, when the magnetic disk does not rotate, the magnetic read write head is not located over the magnetic disk and is pulled off to the position away from the magnetic disk (unload state). When the magnetic disk device is driven and the magnetic disk starts to rotate, the magnetic read write head is changed to a state where the magnetic read write head is located at a predetermined position over the magnetic disk together with the suspension (load state). When the rotation number of the magnetic disk reaches a predetermined number, the magnetic head slider is stabilized in a state of slightly floating over the surface of the magnetic disk due to the balance of positive pressure and negative pressure. Thus, the information is accurately recorded and reproduced.

In recent years, with a progress in higher recording density (higher capacity) of the magnetic disk, an improvement in performance of the magnetic read write head and the magnetic disk has been demanded. The magnetic disk is a discontinuous medium including collected magnetic microparticles, and each magnetic microparticle has a single-domain structure. In the magnetic disk, one recording bit is configured by a plurality of magnetic microparticles. Since the asperity of a boundary between adjacent recording bits is necessary to be small in order to increase the recording density, the magnetic microparticles need to be made small. However, if the magnetic microparticles are small in size, thermal stability of the magnetization of the magnetic micorparticles is lowered with decreasing the volume of the magnetic maicroparticles. To solve the difficulty, it is effective to increase anisotropic energy of the magnetic microparticles. However, increasing the anisotropic energy of the magnetic microparticles leads to increase in the coercivity of the magnetic disk. As a result, difficulty occurs in the information recording using the existing magnetic head.

As a method to solve the above-described difficulty, a so-called heat-assisted magnetic recording has been proposed. In the method, a magnetic recording medium with large coercivity is used. When recording information, heat is applied together with the magnetic field to a portion where the information is recorded out of the magnetic recording medium to increase the temperature and to lower the coercivity, thereby recording the information. Hereinafter, the magnetic head used for the heat-assisted magnetic recording is referred to as a heat-assisted magnetic write head.

In the heat-assisted magnetic recording, near-field light is generally used for applying heat to the magnetic recording medium. As a method of generating near-field light, a method using a near-field light probe that is a metal strip generating near-field light from a plasmon which is excited by light, that is, so-called plasmon generator is generally known. However, it is known that the plasmon generator which generates near-field light by direct irradiation of light converts the irradiated light into near-field light with extremely low efficiency. A large part of energy of light irradiated to the plasmon generator is reflected by the surface of the plasmon generator or converted into heat energy to be absorbed to the plasmon generator. The size of the plasmon generator is set smaller than the wavelength of light so that the volume of the plasmon generator is small. Therefore, in the plasmon generator, increase of temperature involved with the absorption of heat energy becomes extremely large.

In the heat-assisted magnetic recording, from the viewpoint of the efficiency and the precision, on the surface facing the medium, the generation position of the recording magnetic field and the generation position of the near-field light are desirably approached as much as possible. For example, U.S. Patent Application Publication No. 2007/139818 specification discloses a magnetic head in which a near-field light generation section that generates near-field light in response to irradiation of laser light and an end portion of a main magnetic-pole layer are arranged to be laid over with a dielectric layer in between or directly with each other on a surface facing the medium. In addition, U.S. Patent Application Publication No. 2009/168220 specification discloses a magnetic head in which at least a part of a magnetic pole is arranged between first and second near-field light generation sections that respectively generate near-field light in response to irradiation of laser light. However, if a magnetic pole generating recording magnetic field is arranged near a plasmon generator generating near-field light, the main magnetic pole is heated with increasing the temperature of the plasmon generator. As a result, depending on the humidity condition of the atmosphere, there is a possibility that the main magnetic pole is corroded by moisture in the air.

Consequently, it is desirable to suppress corrosion due to the increase of the temperature of the main magnetic pole from occurring, and to secure long-term reliability while maintaining the recording property.

SUMMARY OF THE INVENTION

A heat-assisted magnetic write head according to an embodiment of the invention includes: a magnetic pole having an end surface exposed at an air bearing surface; a waveguide extending toward the air bearing surface to propagate light; and a plasmon generator provided between the magnetic pole and the waveguide, and generating near-field light from the air bearing surface, based on the light propagated through the waveguide. The plasmon generator an end portion exposed at the air bearing surface or located in close proximity to the air bearing surface, the end portion having a minimum thickness in a region close to the waveguide.

A head gimbals assembly, a head arm assembly, and a magnetic disk device according to an embodiment of the invention include the above-described heat-assisted magnetic write head.

In the heat-assisted magnetic write head according to an embodiment of the invention, the plasmon generator has the end portion having a minimum thickness in a region close to the waveguide. Therefore, on the air bearing surface, the magnetic pole and the generating position of the near-field light are further approached. On the other hand, the thickness of a portion other than the portion located close to the waveguide is increased to improve the efficiency of heat dissipation of the plasmon generator. Therefore, compared to the case where the end portion of the plasmon generator has a certain thickness, while the efficiency and precision of the heat-assisted magnetic recording are improved, increase of temperature of the magnetic pole and in the vicinity thereof is suppressed, and therefore the corrosion of the magnetic pole and defect in the configuration near the magnetic pole are less likely to occur. As a result, while securing the long-time reliability, the recording operation may be achieved with increased efficiency and stability.

In the heat-assisted magnetic write head according to an embodiment of the invention, the end portion of the plasmon generator preferably includes, for example, a V-shaped mid-portion including a pointed edge projected toward the waveguide, and a couple of wing portions facing to each other with the mid-portion in between in a direction across write tracks. The magnetic pole is preferably provided to be in contact with the mid-portion of the plasmon generator. Further, the magnetic pole preferably has a width smaller than that of the waveguide and of the mid-portion in the direction across write tracks. When the above-described configuration is applied, distribution of recording magnetic field emitted from the magnetic pole has a steeper shape. As a result, the maximum intensity of the recording magnetic field necessary for information recording is further increased. Moreover, the mid-portion has a minimum thickness at the pointed edge, and the thickness is desirably increased with increasing distance from the pointed edge in the direction across tracks. With such a configuration, the maximum intensity of the recording magnetic field emitted from the magnetic pole is further increased, edge peaks (peaks of recording magnetic field of the magnetic pole in the vicinity of both ends in the direction across tracks) are less likely to occur because an interface between the magnetic pole and the plasmon generator is a smooth curved-surface, and therefore the magnetic flux is suppressed from leaking into the adjacent tracks.

DETAILED DESCRIPTION OF THE PREFERRED EMBODIMENTS

Hereinafter, a preferred embodiment of the invention will be described in detail with reference to drawings.
[Configuration of Magnetic Disk Device]

First, referring to FIG. 1 and FIG. 2, a configuration of a magnetic disk device will be described below as an embodiment of the invention.

Figure 1:
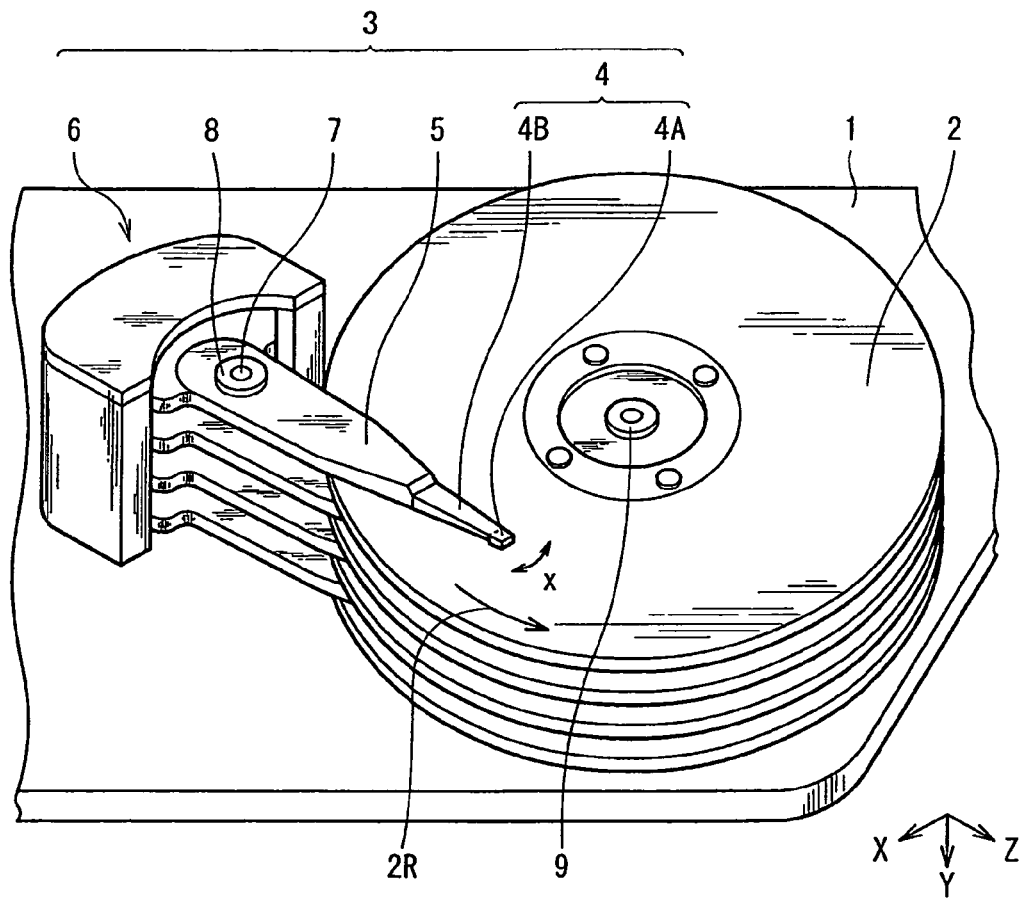
FIG. 1 is a perspective view illustrating a configuration of a magnetic disk device provided with a magnetic read write head according to an embodiment of the invention.

FIG. 1 is a perspective view illustrating an internal configuration of the magnetic disk device as the embodiment. The magnetic disk device adopts load/unload system as a driving system, and includes, inside of the housing 1, a magnetic disk 2 as a magnetic recording medium in which information is to be recorded, and a head arm assembly (HAA) 3 for writing information in the magnetic disk 2 and reading the information. The HAA 3 is provided with a head gimbals assembly (HGA) 4, an arm 5 supporting a base of the HGA 4, and a driving section 6 as a power source for rotating the arm 5. The HGA 4 includes a magnetic head slider (hereinafter, simply referred to as a slider) 4A having a side surface provided with a magnetic read write head (described later) according to the embodiment, and a suspension 4B having an end portion provided with the slider 4A. The arm 5 supports the other end of the suspension 4B (an end portion opposite to the end portion provided with the slider 4A). The arm 5 is configured so as to be rotatable around a fixed shaft 7 fixed to the housing 1 through a bearing 8. The driving section 6 is configured by, for example, a voice coil motor. The magnetic disk device has a plurality (four in FIG. 1) of magnetic disks 2, and the slider 4A is disposed corresponding to recording surfaces (a front surface and a rear surface) of each of the magnetic disks 2. Each slider 4A is capable of moving in a direction crossing a write track, that is, in a direction across tracks (in X-axis direction) in a plane parallel to the recording surface 2S of each magnetic disk 2. On the other hand, the magnetic disk 2 is configured to rotate around a spindle motor 9 fixed to the housing 1 in the rotation direction 2R substantially orthogonal to the X-axis direction. With the rotation of the magnetic disk 2 and the movement of the slider 4A, information is written into the magnetic disk 2 or stored information is read out. Further, the magnetic disk device has a control circuit (described later) which controls a write operation and a read operation of a magnetic read write head 10, and controls an emission operation of a laser diode as a light source which generates laser light used for heat-assisted magnetic recording which will be described later.

Figure 2:
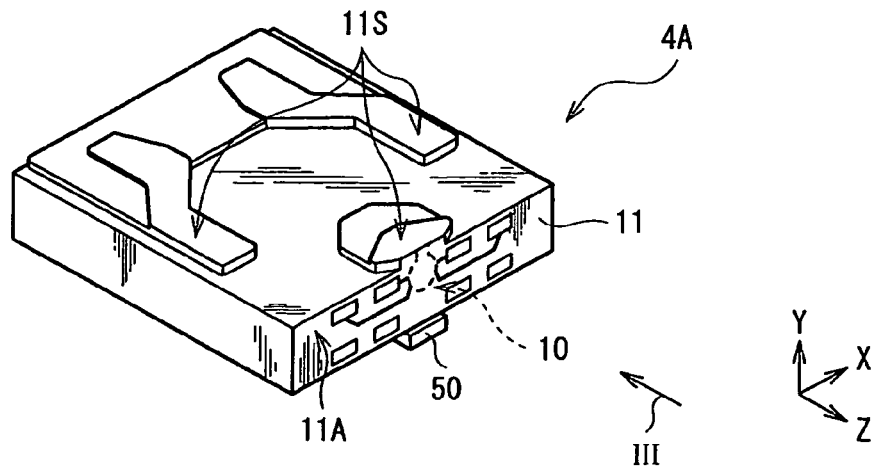
FIG. 2 is a perspective view illustrating a configuration of a slider in the magnetic disk device illustrated in FIG. 1.

FIG. 2 illustrates a configuration of the slider 4A illustrated in FIG. 1. The slider 4A has, for example, a block-shaped substrate 11 made of $Al_2O_3 \cdot TiC$ (AlTiC). The substrate 11 is substantially formed as a hexahedron, for example, and one surface thereof corresponds to an ABS 11S disposed oppositely and proximally to the recording surface 2S of the magnetic disk 2. When the magnetic disk device is not driven, namely, when the spindle motor 9 is stopped and the magnetic disk 2 does not rotate, the slider 4A is pulled off to the position away from the magnetic disk 2 (unload state), in order to prevent contact of the ABS 11S and the recording surface 2S. In contrast, when the magnetic disk device is initiated, the magnetic disk 2 starts to rotate at a high speed by the spindle motor 9, and the arm 5 is rotated around the fixed shaft 7 by the driving section 6. Therefore, the slider 4A moves above the front surface of the magnetic disk 2, and is in a load state. The rotation of the magnetic disk 2 at a high speed leads to air flow between the recording surface 2S and the ABS 11S, and lift force caused by the air flow leads to a state where the slider 4A floats to maintain a certain distance (magnetic spacing) MS (in FIG. 5 described later) along a direction (Y-axis direction) orthogonal to the recording surface 2S. On the element forming surface 11A that is one side surface orthogonal to the ABS 11S, the magnetic read write head 10 is provided. Incidentally, on a surface 11B opposite to the ABS 11S of the substrate 11, a light source unit 50 is provided in the vicinity of the magnetic read write head 10.

[Detailed Configuration of Magnetic Read Write Head]

Next, the magnetic read write head 10 will be described in more detail with reference to FIGS. 3 to 5.

Figure 3:
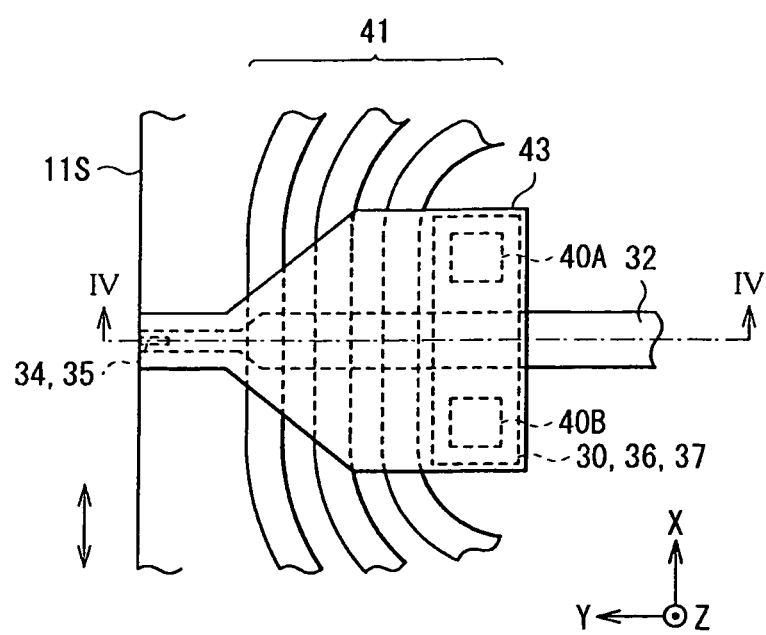
FIG. 3 is a plane view illustrating a configuration of a main part of the magnetic read write head illustrated in FIG. 2, viewed from an arrow III direction.
Figure 4:
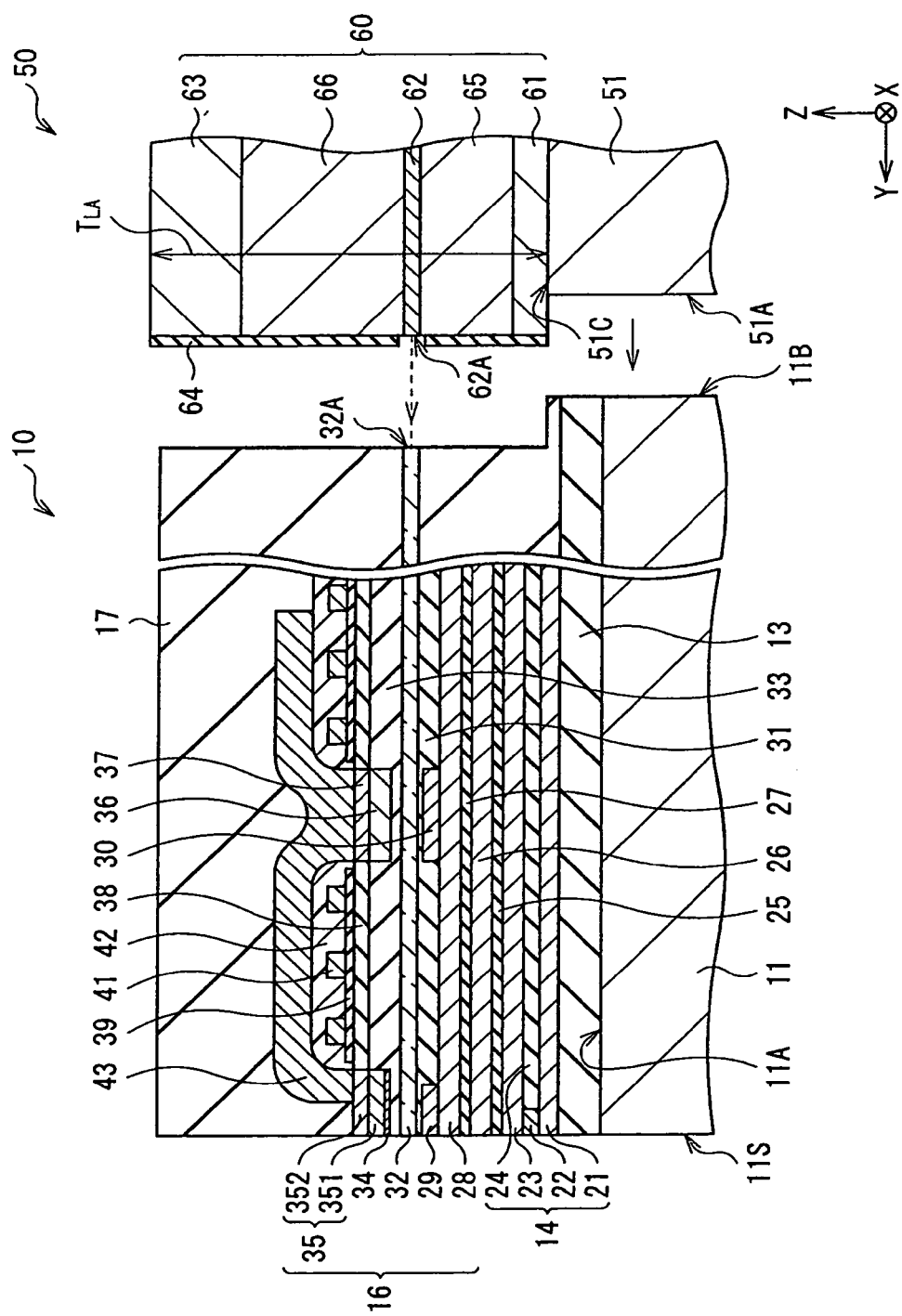
FIG. 4 is a sectional view illustrating a configuration of the magnetic read write head illustrated in FIG. 3, viewed from the arrow direction along a IV-IV line.
Figure 5:
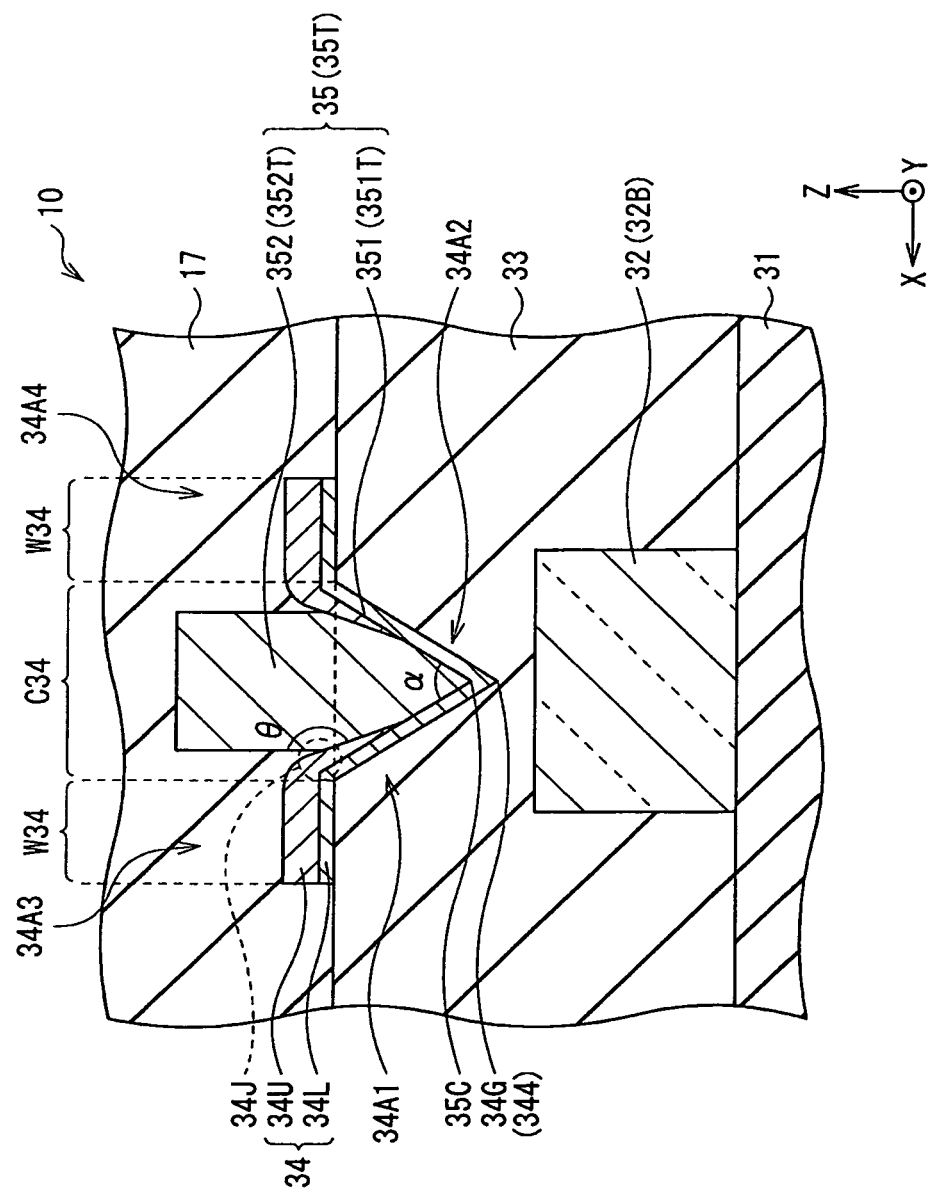
FIG. 5 is a plane view illustrating a configuration of an end surface exposed at an air bearing surface of a main part of the magnetic read write head.

FIG. 3 is a plane view of the magnetic read write head 10 viewed from a direction of an arrow III illustrated in FIG. 2, FIG. 4 is a sectional view illustrating a configuration thereof in an arrow direction along a IV-IV line illustrated in FIG. 3, and FIG. 5 illustrates a part of an end surface exposed at the ABS 11S in enlarged manner. The magnetic read write head 10 has a stacked structure including an insulating layer 13, a read head section 14, a write head section 16, and a protective layer 17 which are stacked in order on the substrate 11. Each of the read head section 14 and the write head section 16 has an end surface exposed at the ABS 11S.

The read head section 14 performs a read process using magneto-resistive effect (MR). The read head section 14 is configured by stacking, for example, a lower shield layer 21, an MR element 22, and an upper shield layer 23 in order on the insulating layer 13.

The lower shield layer 21 and the upper shield layer 23 are respectively formed of a soft magnetic metal material such as NiFe (nickel iron alloy), and are disposed oppositely to sandwich the MR element 22 in the stacking direction (in Z-axis direction). As a result, the lower shield layer 21 and the upper shield layer 23 exhibit a function to protect the MR element 22 from the influence of unnecessary magnetic field.

One end surface of the MR element 22 is exposed at the ABS 11S, and the other surfaces thereof are in contact with an insulating layer 24 filling a space between the lower shield layer 21 and the upper shield layer 23. The insulating layer 24 is formed of an insulating material such as $Al_2O_3$ (aluminum oxide), AlN (aluminum nitride), $SiO_2$ (silicon dioxide), or DLC (diamond-like carbon).

The MR element 22 functions as a sensor for reading magnetic information recorded in the magnetic disk 2. Note that in the embodiment, in a direction (Y-axis direction) orthogonal to the ABS 11S, a direction toward ABS 11S using the MR element 22 as a base or a position near the ABS 11S is called "front side". A direction toward opposite side to the ABS 11S using the MR element 22 as a base or a position away from the ABS 11S is called "back side". The MR element 22 is a CPP (current perpendicular to plane)—GMR (giant magnetoresistive) element whose sense current flows inside thereof in a stacking direction. The lower shield layer 21 and the upper shield layer 23 each function as an electrode to supply the sense current to the MR element 22.

In the read head section 14 with such a structure, a magnetization direction of a free layer (not illustrated) included in the MR element 22 changes depending on a signal magnetic field from the magnetic disk 2. Thus, the magnetization direction of the free layer shows a change relative to a magnetization direction of a pinned layer (not illustrated) also included in the MR element 22. When the sense current is allowed to flow through the MR element 22, the relative change in the magnetization direction appears as the change of the electric resistance. Therefore, the read head section 14 detects the signal magnetic field with use of the change to read the magnetic information.

On the read head section 14, an insulating layer 25, an intermediate shield layer 26, and an insulating layer 27 are stacked in order. The intermediate shield layer 26 functions to prevent the MR element 22 from being affected by a magnetic field which is generated in the write head section 16, and formed of, for example, a soft magnetic metal material such as NiFe. The insulating layers 25 and 27 are formed of the similar material to the insulating layer 24.

The write head section 16 is a vertical magnetic write head performing a recording process of heat-assisted magnetic recording system. The write head section 16 has, for example, a lower yoke layer 28, a leading shield 29 and a connecting layer 30, a clad layer 31, a waveguide 32, and a clad layer 33 in order on the insulating layer 27. Incidentally, the leading shield 29 may be omitted from the structure.

The lower yoke layer 28, the leading shield 29 and the connecting layer 30 each are formed of a soft magnetic metal material such as NiFe. The leading shield 29 is located at the frontmost end of the upper surface of the lower yoke layer 28 so that one end surface of the leading shield 29 is exposed at the ABS 11S. The connecting layer 30 is located backward of the leading shield 29 on the upper surface of the lower yoke layer 28. The clad layer 31 is made of a dielectric material having a refractive index lower than that of the waveguide 32, and is provided to cover the lower yoke layer 28, the leading shield 29 and the connecting layer 30. The waveguide 32 provided on the clad layer 31 extends in a direction (Y-axis direction) orthogonal to the ABS 11S, one end surface of the waveguide 32 is exposed at the ABS 11S, and the other end surface is exposed at the backward thereof. Note that the front end surface of the waveguide 32 may be located at a receded position from the ABS 11S without being exposed at the ABS 11S. The waveguide 32 is formed of a dielectric material which allows laser light to pass through. The clad layers 31 and 33 are configured by a dielectric material having a refractive index lower than that of the waveguide 32, with respect to the laser light propagating through the waveguide 32. For example, when the waveguide 32 is formed of $Al_2O_3$ (aluminum oxide), the clad layers 31 and 33 may be formed of $SiO_2$ (silicon dioxide). Alternatively, the waveguide 32 is configured by $Ta_2O_5$ (tantalum oxide), and the clad layers 31 and 33 may be formed of $Al_2O_3$.

The write head section 16 further includes a plasmon generator 34 provided above the front end of the waveguide 32 through the clad layer 33, and a magnetic pole 35 provided to be in contact with the upper surface of the plasmon generator 34. The plasmon generator 34 and the magnetic pole 35 are arranged so that one end surface of each of the plasmon generator 34 and the magnetic pole 35 is exposed at the ABS 11S. The magnetic pole 35 is configured by stacking a first layer 351 and a second layer 352 in order on the plasmon generator 34. Both the first layer 351 and the second layer 352 are configured of a magnetic material with high saturation flux density such as iron-based alloy. Examples of the iron-based alloy include FeCo (iron cobalt alloy), FeNi (iron nickel alloy), and FeCoNi (iron cobalt nickel alloy). The plasmon generator 34 generates near-field light NF (described later) from the ABS 11S, based on the laser light which is propagated through the waveguide 32. The magnetic pole 35 stores therein magnetic flux generated in a coil 41 (described later), releases the magnetic flux from the ABS 11S, thereby generating a recording magnetic field for writing magnetic information into the magnetic disk 2. The plasmon generator 34 and the first layer 351 are embedded in the clad layer 33. The detail of the configurations, functions and the like of the plasmon generator 34 and the magnetic pole 35 will be described later.

The write head section 16 further includes a connecting layer 36 embedded in the clad layer 33 at the backward of the plasmon generator 34 and the magnetic pole 35, and a connecting layer 37 provided to be in contact with the upper surface of the connecting layer 36. Both the connecting layers 36 and 37 are arranged above the connecting layer 30 and are formed of a soft magnetic metal material such as NiFe.

As illustrated in FIG. 3, the write head section 16 is provided with two connecting sections 40A and 40B which are embedded in the clad layers 31 and 33. The connecting sections 40A and 40B are also formed of a soft magnetic metal material such as NiFe. The connecting sections 40A and 40B extend in Z-axis direction so as to connect the connecting layer 30 and the connecting layer 36, and are arranged in X-axis direction so as to sandwich the waveguide 32 with a distance.

On the clad layer 33, an insulating layer 38 is provided to fill a space around the second layer 352 of the magnetic pole 35. On the insulating layer 38, an insulating layer 39 and the coil 41 which is formed in spiral around the connecting layer 37, are stacked in order. The coil 41 is intended to generate magnetic flux for recording by flow of a write current, and is formed of a high conductive material such as Cu (copper) and Au (gold). The insulating layers 38 and 39 are configured of an insulating material such as $Al_2O_3$, AlN, $SiO_2$ or DLC. The insulating layers 38 and 39 and the coil 41 are covered with an insulating layer 42, and an upper yoke layer 43 is further provided to cover the insulating layer 42. The insulating layer 42 is configured of, for example, a non-magnetic insulating material flowing on heating, such as a photoresist or a spin on glass (SOG). The insulating layers 38, 39, and 42 are intended to electrically separate the coil 41 from other nearby devices. The upper yoke layer 43 is formed of a soft magnetic material with high saturation flux density such as CoFe, the front portion thereof is connected to the second layer 352 of the magnetic pole 35, and a part of the rear portion is connected to the connecting layer 37. In addition, the front end surface of the upper yoke layer 43 is located at a receded position from the ABS 11S.

In the write head section 16 with such a structure, by the write current flowing through the coil 41, magnetic flux is generated inside a magnetic path which is mainly configured by the leading shield 29, the lower yoke layer 28, the connecting layer 30, the connecting sections 40A and 40B, the connecting layers 36 and 37, the upper yoke layer 43, and the magnetic pole 35. Accordingly, a signal magnetic field is generated near the end surface of the magnetic pole 35 exposed at the ABS 11S, and the signal magnetic field reaches a predetermined region of the recording surface 2S (described later) of the magnetic disk 2.

Further, in the magnetic read write head 10, a protective layer 17 made of $Al_2O_3$ or the like is formed to cover the entire upper surface of the write head section 16.

The light source unit 50 provided at the backward of the magnetic read write head 10 includes a laser diode 60 as a light source for emitting laser light, and a rectangular-solid supporting member 51 supporting the laser diode 60.

The supporting member 51 is formed of, for example, a ceramic material such as $Al_2O_3$.TiC. As illustrated in FIG. 4, the supporting member 51 is provided with an adhesive surface 51A to be adhered to a rear surface 11B of the substrate 11, and a light source mounting surface 51C provided to be orthogonal to the adhesive surface 51A. The light source mounting surface 51C is parallel to the element forming surface 11A. The laser diode 60 is mounted on the light source mounting surface 51C. The supporting member 51 desirably has a function as a heat sink for dissipating heat generated by the laser diode 60, in addition to a function to support the laser diode 60.

Laser diodes generally used for communication, for optical disc storage, or for material analysis, for example, InP-based, GaAs-based or GaN-based laser diodes, may be used as the laser diode 60. The wavelength of the laser light emitted from the laser diode 60 may be any value within the range of 375 nm to 1.7 μm. Specifically, examples of such a laser diode include a laser diode of InGaAsP/InP quaternary mixed crystal with the emission wavelength region of 1.2 to 1.6 μm. As illustrated in FIG. 4, the laser diode 60 has a multilayer structure including a lower electrode 61, an active layer 62, and an upper electrode 63. An n-type semiconductor layer 65 including n-type AlGaN is inserted between the lower electrode 61 and the active layer 62, and a p-type semiconductor layer 66 including p-type AlGaN is inserted between the active layer 62 and the upper electrode 63. On each of two cleavage surfaces of the multilayer structure, a reflecting layer 64 is provided, which totally reflects light to excite oscillation and is formed of $SiO_2$, $Al_2O_3$, or the like. In the reflecting layer 64, an aperture for emitting laser light is provided at a position including an emission center 62A of the active layer 62. The relative position of the light source unit 50 and the magnetic read write head 10 is fixed by adhering the adhesive surface 51A of the supporting member 51 to the rear surface 11B of the substrate 11 so that the emission center 62A and the rear end surface 32A of the waveguide 32 are coincident with each other. The thickness $T_{LA}$ of the laser diode 60 is, for example, within a range of about 60 to 200 μM. A predetermined voltage is applied between the lower electrode 61 and the upper electrode 63 so that laser light is emitted from the emission center 62A of the active layer 62, and is then incident to the rear end surface 32A of the waveguide 32. The laser light emitted from the laser diode 60 is preferably polarized light of TM mode whose electric field oscillates in a direction perpendicular to the surface of the active layer 62. The laser diode 60 may be driven with use of a power source in the magnetic disk device. The magnetic disk device generally includes a power source generating a voltage of about 2V, for example, and the voltage generated by the power source is sufficient to drive the laser diode 60. In addition, the laser diode 60 consumes power of about several tens mW, which may be sufficiently covered by the power source in the magnetic disk device.

Figure 6:
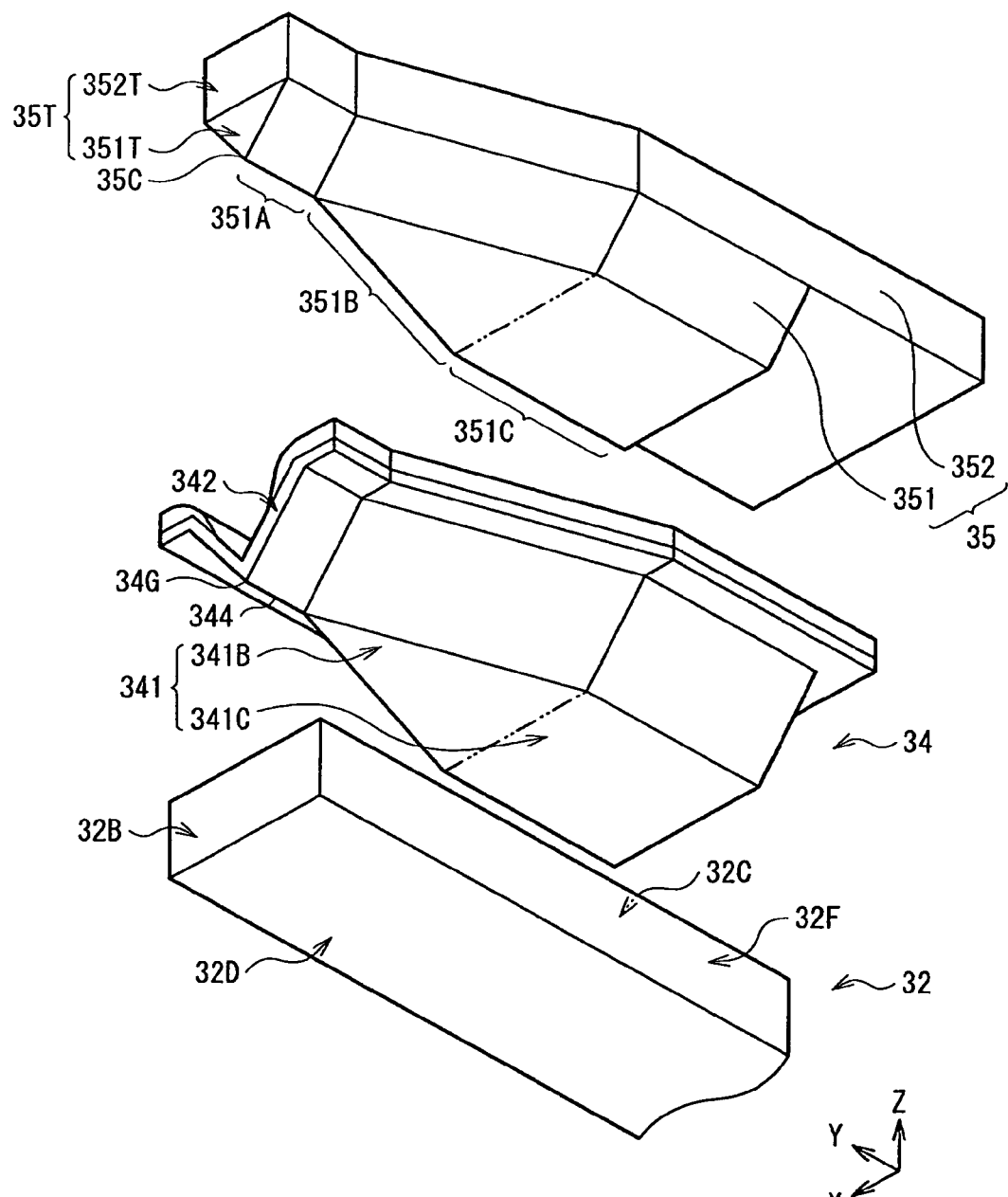
FIG. 6 is an exploded perspective view illustrating a configuration of a main part of the magnetic read write head.
Figure 7:
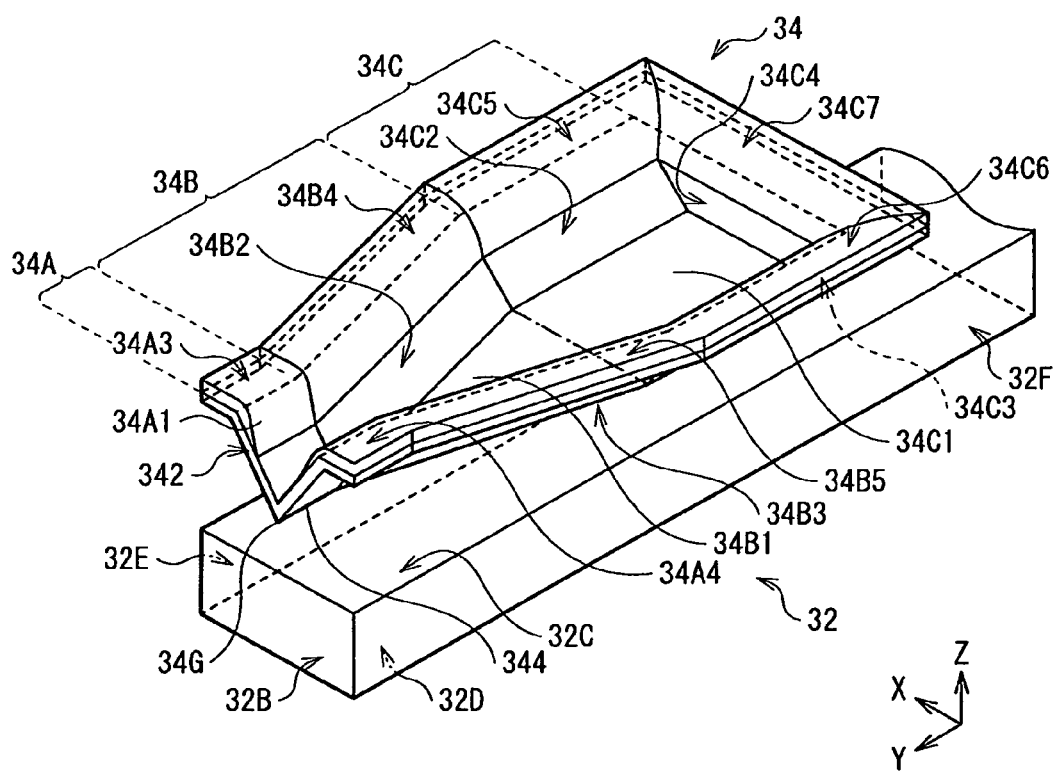
FIG. 7 is another perspective view illustrating a configuration of the main part of the magnetic read write head.
Figure 8:
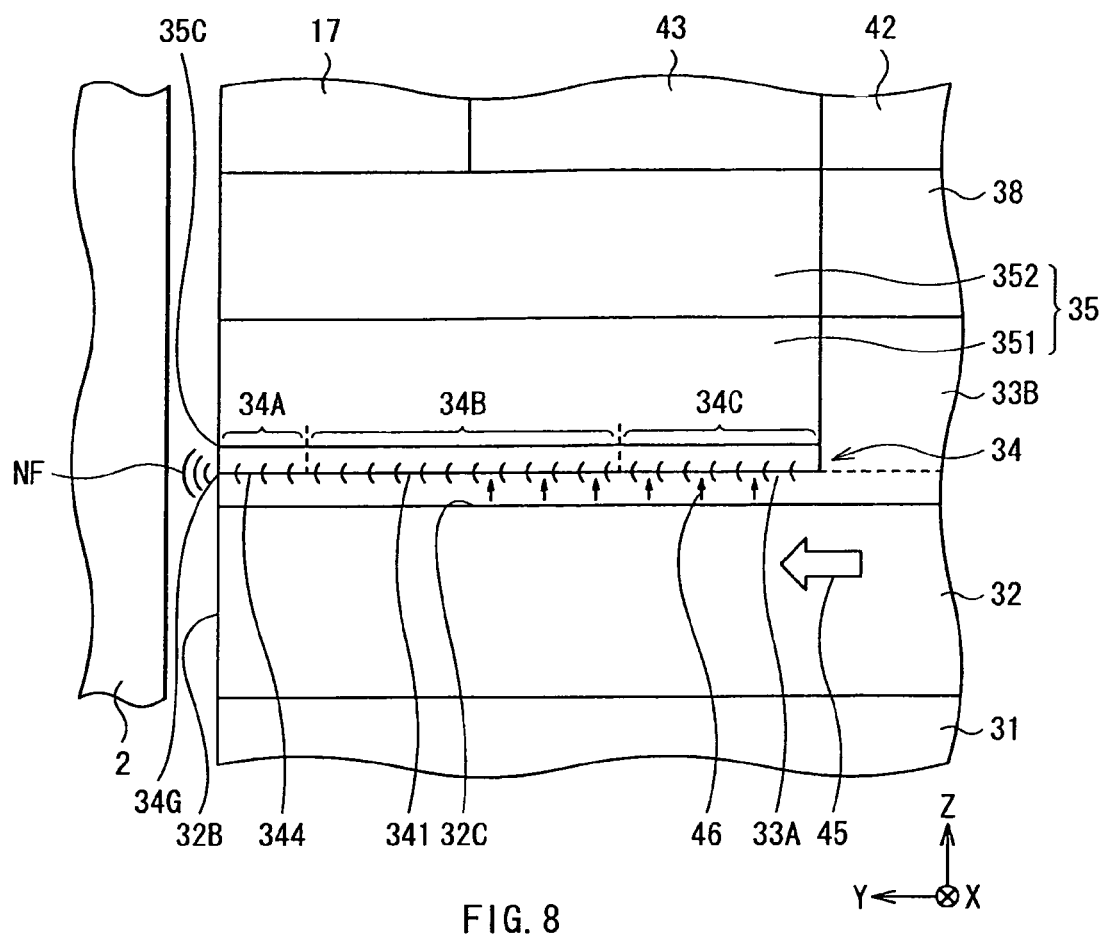
FIG. 8 is a sectional view illustrating a configuration of a section surface, which is orthogonal to the air bearing surface, of the main part of the magnetic read write head.
Figure 9:
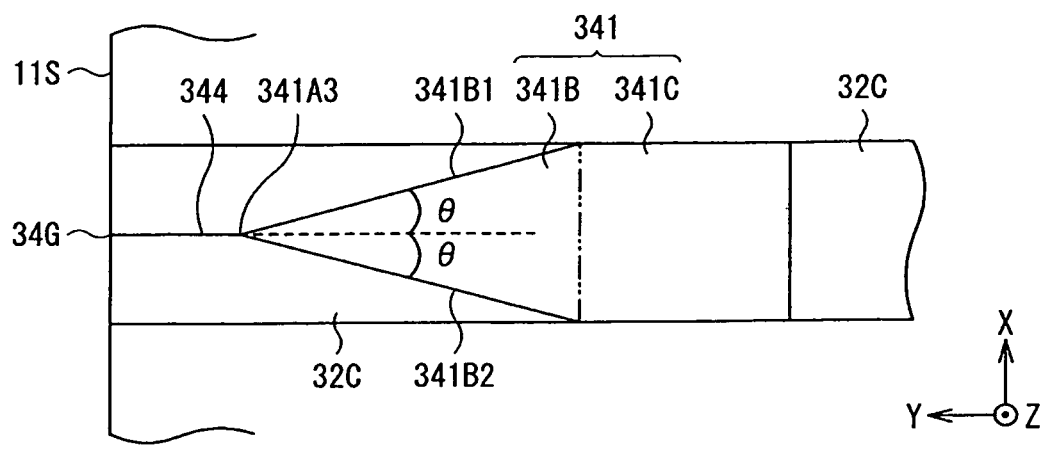
FIG. 9 is a plane view illustrating the main part of the magnetic read write head.

Next, referring to FIGS. 6 to 9 in addition to FIG. 5, the structure and the functions of each of the waveguide 32, the plasmon generator 34, and the magnetic pole 35 will be described in detail. FIG. 6 is an exploded perspective view illustrating the structure of each of the waveguide 32, the plasmon generator 34, and the magnetic pole 35, and FIG. 7 is a perspective view illustrating shapes and positional relationship of the waveguide 32 and the plasmon generator 34. FIG. 8 is a sectional view illustrating the structures and the functions of the waveguide 32, the plasmon generator 34, and the magnetic pole 35, and the section surface is orthogonal to the ABS 11S. FIG. 9 is a plane view illustrating the main part of the plasmon generator 34 viewed from the upper side.

As illustrated in FIG. 7, for example, the waveguide 32 includes an end surface 32B closer to the ABS 11S, an evanescent light generating surface 32C as an upper surface, a lower surface 32D, and two side surfaces 32E and 32F, besides the rear end surface 32A illustrated in FIG. 4. The evanescent light generating surface 32C generates evanescent light based on the laser light propagating through the waveguide 32. In FIGS. 6 to 9, although the end surface 32B arranged on the ABS 11S is exemplified, the end surface 32B may be arranged at a position spaced from the ABS 11S.

As illustrated in FIG. 7, the plasmon generator 34 has a first portion 34A, a second portion 34B, and a third portion 34C in order from the ABS 11S side. In FIG. 7, the boundary between the second portion 34B and the third portion 34C is indicated by a two-dot chain line. The first to third portions 34A, 34B, and 34C each have a tow-layer structure provided with an upper layer 34U on a lower layer 34L. The lower layer 34L and the upper layer 34U are preferably formed of a material essentially (substantially) including one or more of Ag (silver), Cu (copper), Au (gold), Al (aluminum), W (tungsten), Si (silicon), Ir (iridium), Mo (molybdenum), Zn (zinc), Ru (ruthenium), Co (cobalt), Ni (nickel), Cr (chromium), Fe (iron), Pd (palladium), Pt (platinum), Rh (rhodium), Sn (tin), Ta (tantalum), Nb (niobium), Diamond, AlN (aluminum nitride), SiC (silicon carbide), SiAlN, and BN (boron nitride). "Essentially (substantially) include" means that the above-described materials are included as a main component, and the other materials may be included as a sub-component (for example, impurity) as long as the function to generate near-field light NF from the ABS 11S, based on the laser light propagated through the waveguide 32 is exerted. Here, the constituent materials of the lower layer 34L and the upper layer 34U may be the same kind or different kinds.

As illustrated in FIG. 5, the first portion 34A has a V-shaped mid-portion C34 including an edge 344 which is projected toward the waveguide on a section surface parallel to the ABS 11S, and a couple of wing portions W34 facing to each other with the mid-portion C34 in between in the direction across tracks (X-axis direction). The first portion 34A has a thickness different along X-axis direction (refer to FIG. 5 to FIG. 7). In other words, the first portion 34A has a thickness distribution along X-axis direction. Note that the shape of the section surface of the first portion 34A parallel to the ABS 11S is not changed regardless of the distance from the ABS 11S.

A V-shaped groove is provided in the mid-portion C34 of the first portion 34A. In other words, a pair of sidewalls 34A1 and 34A2 which respectively extend in a direction orthogonal to the ABS 11S is connected with each other at the edge 344 so as to form a V-shape having a vertex angle α on a section surface parallel to the ABS 11S. To increase the generation efficiency of the near-field light, the vertex angle α is desirably within a range of 55° to 90° both inclusive, and 60° is particularly desirable. The edge 344 is a boundary portion between the pair of the sidewalls 34A1 and 34A2, and extends in Y-axis direction from a pointed edge 34G exposed at the ABS 11S as a base point to the second portion 34B. The pointed edge 34G is a portion generating the near-field light. The edge 344 faces the evanescent light generating surface 32C of the waveguide 32, and the sidewalls 34A1 and 34A2 are tilted so that the relative distance in X-axis direction becomes wider with increasing distance from the waveguide 32 with the edge 344 being a base point.

In the wing portions W34 of the first portion 34A, a pair of fringes 34A3 and 34A4 is provided so that one end of each of the fringes 34A3 and 34A4 in X-axis direction is connected to an end portion on the opposite side to the edge 344 of the sidewalls 34A1 and 34A2, respectively. The pair of the fringes 34A3 and 34A4 extends along a plane (XY-plane) orthogonal to the ABS 11S and parallel to X-axis direction. The sidewalls 34A1 and 34A2 and the fringes 34A3 and 34A4 have a front end surface 342 exposed at the ABS 11S (FIG. 6 and FIG. 7). The first portion 34A has a two-layer structure including the lower layer 34L and the upper layer 34U. The lower layer 34L has a substantially uniform thickness over the mid-portion C34 and the couple of the wing portions W34. On the other hand, the upper layer 34U is not provided on the pointed edge 34G (edge 344) of the mid-portion C34 and in the vicinity thereof, and is formed in the vicinity of connecting portion with the wing portion W34 of the mid-portion C34. Specifically, the upper layer 34U of the mid-portion C34 has a thickness to be increased with increasing distance from the pointed edge 34G (edge 344). Thus, the thickness of the sidewalls 34A1 and 34A2 is minimum at the pointed edge 34G (edge 344) as a whole, and are increased with increasing distance from the pointed edge 34G (edge 344) in X-axis direction. In addition, the upper layer 34U configuring the fringes 34A3 and 34A4 of the wing portions W34 has, for example, a fixed thickness equivalent to the maximum thickness of the upper layer 34U of the sidewalls 34A1 and 34A2.

As illustrated in FIG. 7, the second portion 34B has a plate-like bottom portion 34B1 facing the evanescent light generating surface 32C, two plate-like sidewalls 34B2 and 34B3, and fringes 34B4 and 34B5. The bottom portion 34B1 is configured so that the width in the X-axis direction is zero at the boundary portion with the first portion 34A, and becomes wider with increasing distance from the ABS 11S. The sidewalls 34B2 and 34B3 are provided upright, at both end edge of the bottom portion 34B1 in X-axis direction, toward the side opposite to the waveguide 32. Here, the sidewalls 34B2 and 34B3 are tilted so that the relative distance (a distance in X-axis direction) becomes wider with increasing distance from the waveguide 32 with the portion connected to the bottom portion 34B1 being a base point. In addition, the sidewalls 34B2 and 34B3 are connected to the sidewalls 34A1 and 34A2 of the first portion 34A, respectively. Further, the fringes 34B4 and 34B5 are connected to an end portion opposite to the side of the bottom portion 34B1 of the sidewalls 34B2 and 34B3, respectively, and also connected to the fringes 34A3 and 34A4 of the first portion 34A, respectively. Moreover, in the sidewalls 34B2 and 34B3 and the fringes 34B4 and 34B5, the section surfaces orthogonal to the corresponding extending direction preferably have the similar shape to that of the section surfaces of the sidewalls 34A1 and 34A2 and the fringes 34A3 and 34A4 of the first portion 34A, respectively. In other words, the sidewalls 34B2 and 34B3 preferably have a portion whose thickness is gradually increased with increasing distance from the bottom portion 34B1, and the fringes 34B4 and 34B5 preferably have a fixed thickness equivalent to the maximum thickness of the sidewalls 34B2 and 34B3, respectively.

The third portion 34C includes a bottom portion 34C1, sidewalls 34C2 and 34C3, a wall 34C4, and fringes 34C5, 34C6, and 34C7. The bottom portion 34C1 is provided so as to extend continuously from the bottom portion 34B1 of the second portion 34B in XY-plane. The sidewalls 34C2 and 34C3 are respectively connected to the sidewalls 34B2 and 34B3 of the second portion 34B, and extend to be orthogonal to the ABS 11S. The sidewalls 34C2 and 34C3 are tilted so that the relative distance (the distance in X-axis direction) becomes wider with increasing distance from the waveguide 32, with the connecting portion to the bottom portion 34C1 being a base point. The wall 34C4 couples the bottom portion 34C1 and the rear end of each of the sidewalls 34C2 and 34C3. The fringes 34C5 and 34C6 are respectively coupled to the fringes 34B4 and 34B5 of the second portion 34B, and extend to be orthogonal to the ABS 11S. The fringe 34C7 couples the fringes 34C5 and 34C6 and the rear end of the wall 34C4. The section surface of each of the sidewalls 34C2 and 34C3 and the fringes 34C5 and 34C6, which is orthogonal to the corresponding extending direction, preferably have the similar shape to that of the section surface of each of the sidewalls 34A1 and 34A2 and the fringes 34A3 and 34A4 of the first portion 34A, for example. In other words, the sidewalls 34C2 and 34C3 have a portion which is gradually increased in thickness with increasing distance from the bottom portion 34C1, and the fringes 34C5 and 34C6 have a fixed thickness equivalent to the maximum thickness of the sidewalls 34C2 and 34C3, respectively. Note that the wall 34C4 and the fringe 34C7 may not be provided.

As illustrated in FIG. 6 and FIG. 7, the first portion 34A, the second portion 34B, and the third portion 34C form a space inside thereof for containing the first layer 351 of the magnetic pole 35.

The surfaces of the bottom portions 34B1 and 34C1 facing the evanescent light generating surface 32C of the waveguide 32 with a predetermined distance are a first surface 341B and a second surface 341C which form a surface plasmon exciting surface 341 as illustrated in FIG. 6. In FIG. 6, the boundary between the first surface 341B and the second surface 341C is indicated by a two-dot chain line.

The magnetic pole 35 has an end surface 35T exposed at the ABS 11S as illustrated in FIG. 5 and FIG. 6. The end surface 35T includes an end surface 351T exposed at the ABS 11S in the first layer 351, and an end surface 352T exposed at the ABS 11S in the second layer 352.

The first layer 351 of the magnetic pole 35 is contained in a space formed by the first portion 34A, the second portion 34B, and the third portion 34C of the plasmon generator 34. Specifically, the first layer 351 has a first portion 351A occupying a space formed by the first portion 34A, a second portion 351B occupying a space formed by the second portion 34B, and a third portion 351C occupying a space formed by the third portion 34C. The first portion 351A has a triangular prism shape closely contacting the sidewalls 34A1 and 34A2 of the first portion 34A of the plasmon generator 34, and the area of the section surface parallel to the ABS 11S is constant. In X-axis direction, the width of the first portion 351A is desirably smaller than that of the mid-portion C34 of the first portion 34A. This is because the maximum intensity of the recording magnetic field from the magnetic pole 35 is increased. The end surface 351T of the first portion 351A has a pointed edge 35C located at a vertex opposite to the second layer 352.

The second portion 351B is closely contacted with the sidewalls 34B2 and 34B3 and the bottom portion 34B1 of the second portion 34B of the plasmon generator 34. The width of the second portion 351B in X-axis direction becomes wider with increasing the distance from the ABS 11S, and becomes wider in Z-axis direction with increasing the distance from the waveguide 32. The third portion 351C is closely contacted with the sidewalls 34C2 and 34C3 and the bottom portion 34C1 of the third portion 34C of the plasmon generator 34. The width of the third portion 351C in X-axis direction is constant in Y-axis direction, and becomes wider in Z-axis direction with increasing the distance from the waveguide 32.

As illustrated in FIG. 8, in the clad layer 33, a portion disposed between the evanescent light generating surface 32C and the surface plasmon exciting surface 341 is a buffer portion 33A. In the clad layer 33, a portion located backward of the plasmon generator 34 and the first layer 351 is a rear portion 33B.

FIG. 9 is a plane view illustrating a positional relationship between the surface plasmon exciting surface 341 and the evanescent light generating surface 32C, and illustrates the plasmon generator 34 and the waveguide 32 viewed from the magnetic pole 35 side. However, as for the plasmon generator 34, only a surface facing the evanescent light generating surface 32C is illustrated, and the other surfaces are omitted in illustration. As illustrated in FIG. 9, the width of the first surface 341B in X-axis direction becomes smaller toward the ABS 11S. The first surface 341B has a front end portion 341A3 at a position where end edges 341B1 and 341B2 in X-axis direction intersect with each other. Angles formed by the end edges 341B1 and 341B2 with respect to a direction (Y-axis direction) perpendicular to the ABS 11S are equal to each other. Hereinafter, the angle is represented by θ. The angle θ is within a range of 3 to 50 degrees, for example, and in particular, preferably within a range of 10 to 25 degrees.

[Method of Manufacturing Magnetic Read Write Head]

In addition to FIG. 4, referring to FIGS. 10 to 16, the method of manufacturing the magnetic read write head 10 will be described. FIGS. 10 to 16 are for describing forming processes of a main part of the magnetic read write head 10, and illustrate the sectional configuration of the position to be the ABS 11S eventually. In the following description, first, outline of the entire manufacturing processes will be described with reference to FIG. 4, and then the forming processes of the main part (the plasmon generator 34, the magnetic pole 35, and a heat sink 44) will be described with reference to FIGS. 10 to 16. At this time, since the detail of the constituent materials and shapes of the components has already been described, the description thereof is appropriately omitted.

The magnetic read write head 10 is manufactured mainly by sequentially forming and stacking the components by using an existing thin film process. The existing thin film process includes, for example, film forming technique such as electrolytic plating and sputtering, patterning technique such as photolithography, etching technique such as dry etching and wet etching, and polishing technique such as chemical mechanical polishing (CMP).

First, the insulating layer 13 is formed on the substrate 11. Next, the lower shield layer 21, the MR element 22 and the insulating layer 24, and the upper shield layer 23 are stacked and formed in this order on the insulating layer 13 to form the read head section 14. Then, the insulating layer 25, the intermediate shield layer 26, and the insulating layer 27 are stacked in order on the read head section 14.

After that, the lower yoke layer 28, the leading shield 29 and the connecting layer 30, the clad layer 31, the waveguide 32, the clad layer 33, the plasmon generator 34, the magnetic pole 35, and the connecting layers 36 and 37 are formed in order on the insulating layer 27. Note that the formation of the leading shield 29 may be omitted. Further, by performing a planarization treatment after the insulating layer 38 is formed to cover the entire surface, the upper surfaces of the magnetic pole 35, the insulating layer 38, and the connecting layer 37 are planarized. Subsequently, the coil 41 embedded by the insulating layers 39 and 42 is formed. Moreover, the upper yoke layer 43 connected with the magnetic pole 35 and the connecting layer 37 is formed to complete the write head section 16. After that, the protective layer 17 is formed on the write head section 16, and by using CMP, the side surface of the stacked structure from the substrate 11 to the protective layer 17 is totally polished to form the ABS 11S. As a result, the magnetic read write head 10 is completed.

Figure 10:
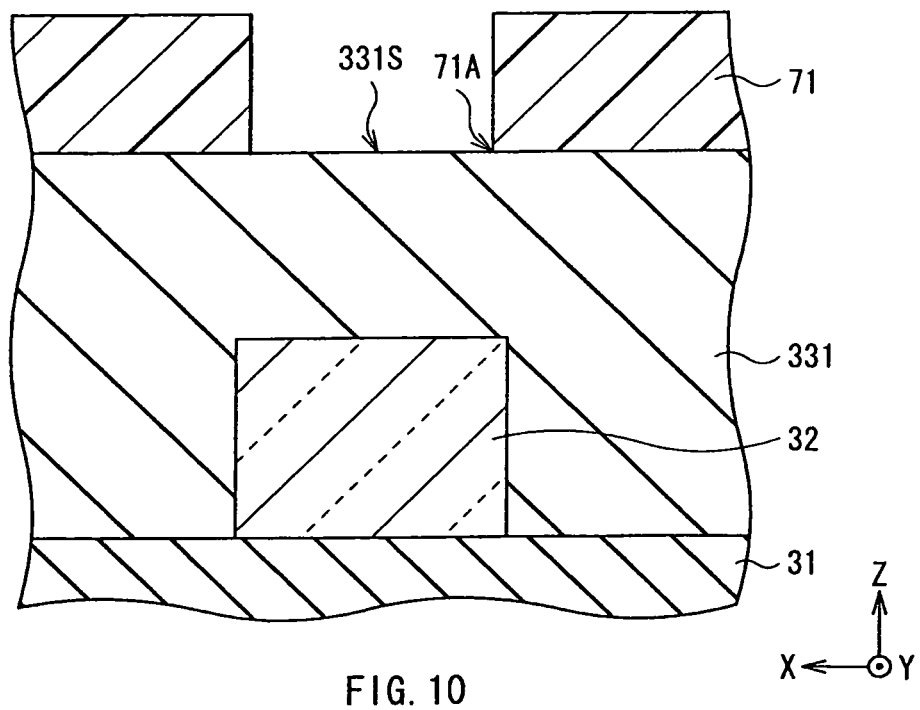
FIG. 10 is a sectional view for describing a manufacturing process of the main part of the magnetic read write head.

When the main part of the magnetic read write head 10 is formed, as illustrated in FIG. 10, first, a dielectric layer 331 is formed to cover the waveguide 32 provided on the clad layer 31. The dielectric layer 331 is to be a part of the clad layer 33, and is formed of the above-described predetermined dielectric material. After that, an etching mask 71 made of a photoresist is formed on the dielectric layer 331. The etching mask 71 has an aperture 71A with a size slightly larger than the outer rim of the upper end of the plasmon generator 34 which is formed later.

Figure 11:
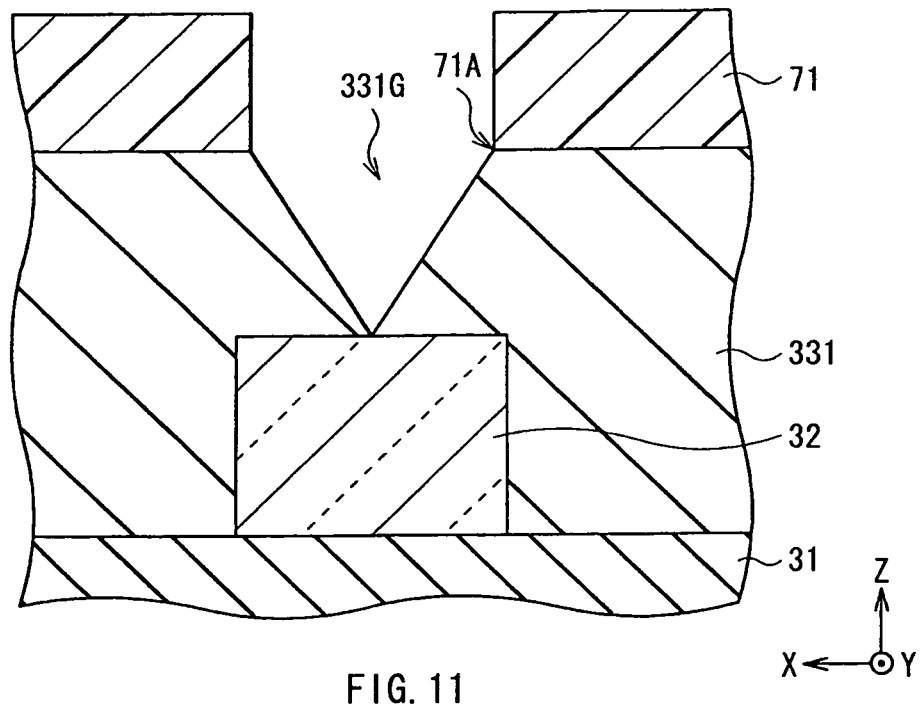
FIG. 11 is a sectional view for describing a process following the process of FIG. 10.

Next, as illustrated in FIG. 11, a V-shaped groove 331G is formed in the dielectric layer 331 by etching a portion (exposed portion) of the dielectric layer 331 corresponding to the aperture 71A by, for example, reactive ion etching. The groove 331G is formed so that the lower end thereof is reached to the upper surface of the waveguide 32. The groove 331G is formed to have a shape slightly larger than the outer shape of the plasmon generator 34 which is formed later.

Figure 12:
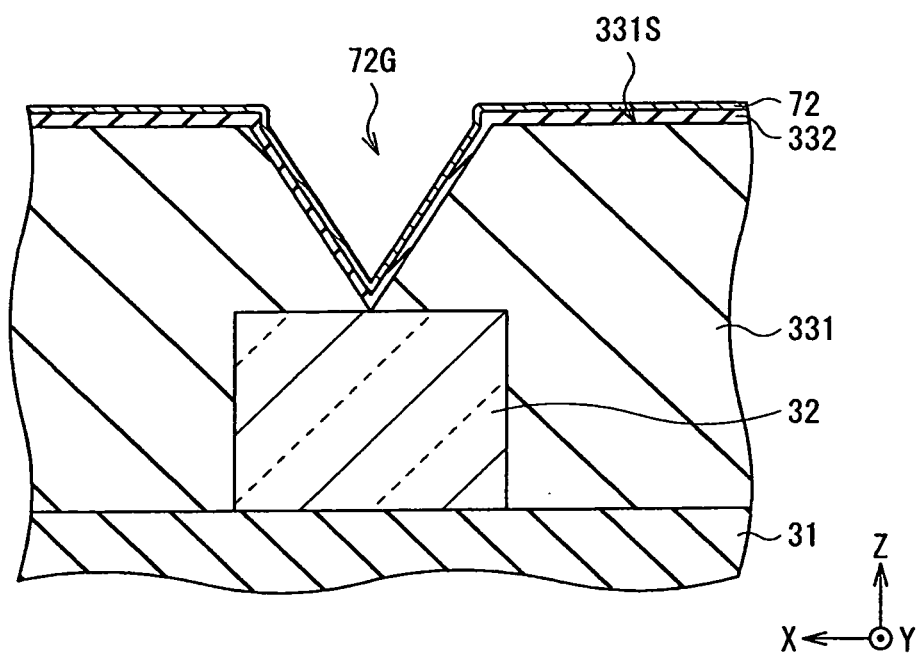
FIG. 12 is a sectional view for describing a process following the process of FIG. 11.

Subsequently, as illustrated in FIG. 12, the etching mask 71 is lifted off, and then a dielectric layer 332 is formed to cover the entire surface by, for example, sputtering. The dielectric layer 332 is to be a part of the clad layer 33 later similar to the dielectric layer 331, and is configured by the above-described predetermined dielectric material. After the dielectric layer 332 is formed, an adhesive film 72 is formed by sputtering to cover the dielectric layer 332. The adhesive layer 72 is formed of, for example, Ti (titanium) or Ta (tantalum), and has a function to improve adhesiveness between the clad layer 33 and the plasmon generator 34. The adhesive film 72 has a thickness of about 1 nm. The dielectric layer 332 and the adhesive film 72 are formed to cover not only the upper surface of the dielectric layer 331 but also the inner surface of the groove 331G. After the adhesive film 72 is formed, the stacked body has a concave section 72G formed to contain the plasmon generator 34 to be formed later.

Figure 13:
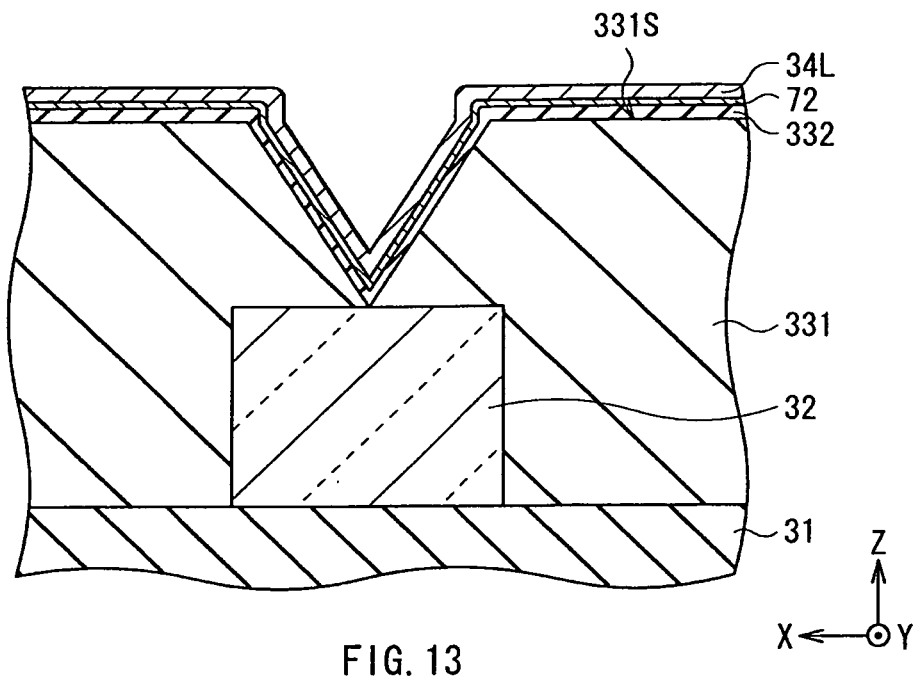
FIG. 13 is a sectional view for describing a process following the process of FIG. 12.
Figure 14:
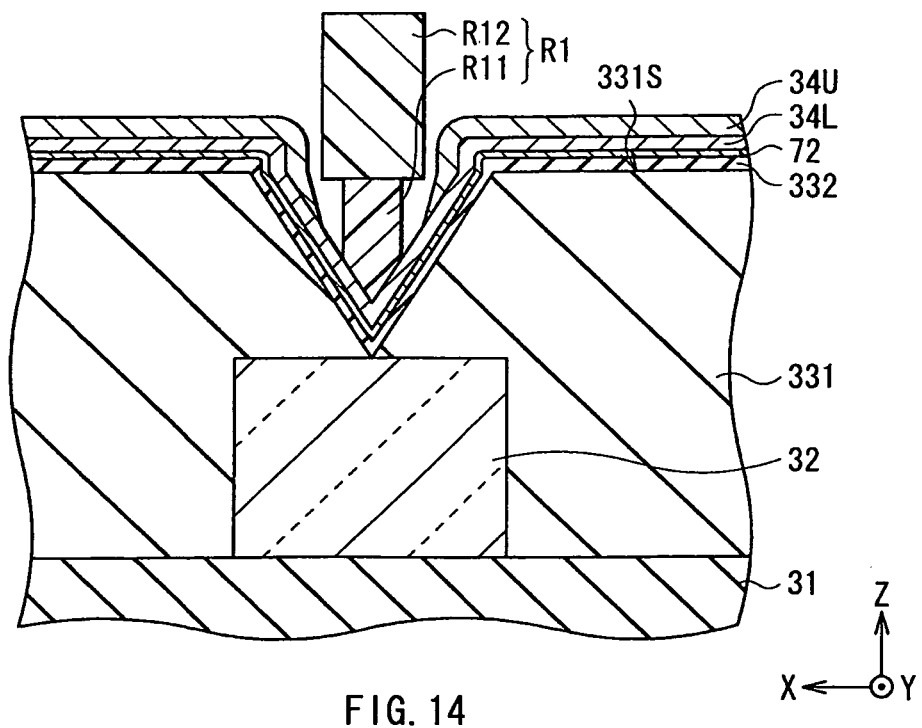
FIG. 14 is a sectional view for describing a process following the process of FIG. 13.

Next, as illustrated in FIG. 13, a lower layer 34L of the plasmon generator 34 to be formed later is formed to cover the entire adhesive film 72 by, for example, sputtering or ion beam deposition (IBD). At this time, the lower layer 34L has a substantially uniform thickness, and includes a V-shaped portion similar to the shape of the groove 331G. Further, as illustrated in FIG. 14, on the V-shaped portion of the lower layer 34L, a resist pattern R1 having two layers of a lower layer R11 and an upper layer R12 is formed. At this time, the side surface of the upper layer R12 is separated form the lower layer 34L. In addition, the width of the lower layer R11 in X-axis direction is narrower than the width of the upper layer R12 so that the resist pattern R1 may have an undercut. Note that as for the resist pattern R1, the lower layer R11 may be formed of, for example, polymethylglutarimide (PMGI), and the upper layer R12 may be formed of, for example, a chemically amplified positive resist. After that, the resist pattern R1 is used as a mask to selectively form the upper layer 34U on the lower layer 34L by, for example, sputtering or ion beam deposition (IBD).

Figure 15:
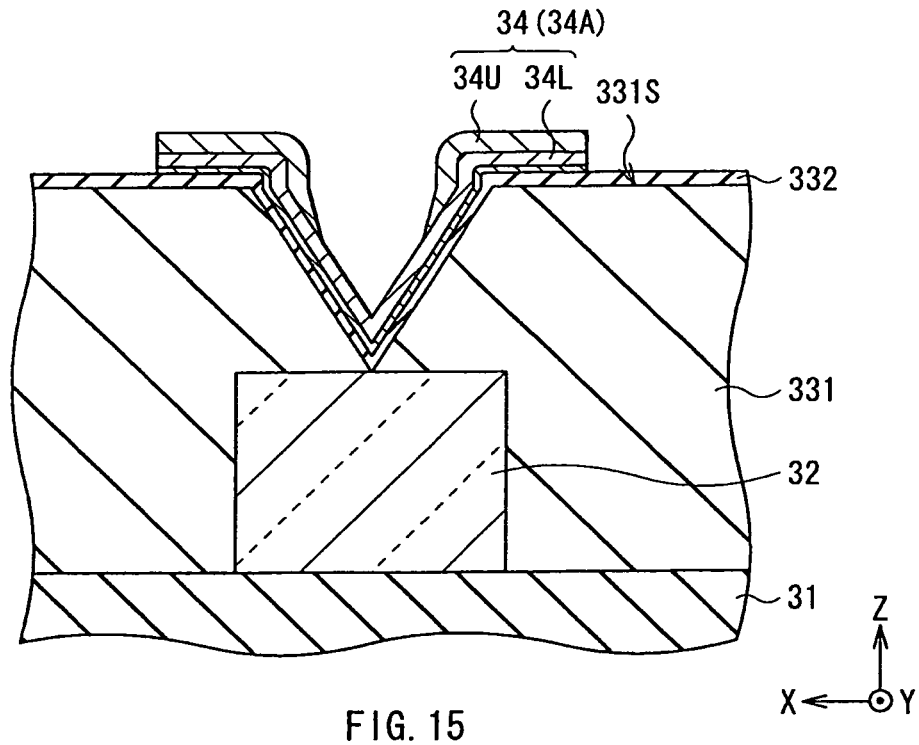
FIG. 15 is a sectional view for describing a process following the process of FIG. 14.

Subsequently, as illustrated in FIG. 15, patterning is performed on the upper layer 34U and the lower layer 34L after the resist pattern R1 is removed. As a result, the plasmon generator 34 with a first portion 34A including the mid-portion C34 and the wing portions W34, is formed in a predetermined shape.

Figure 16:
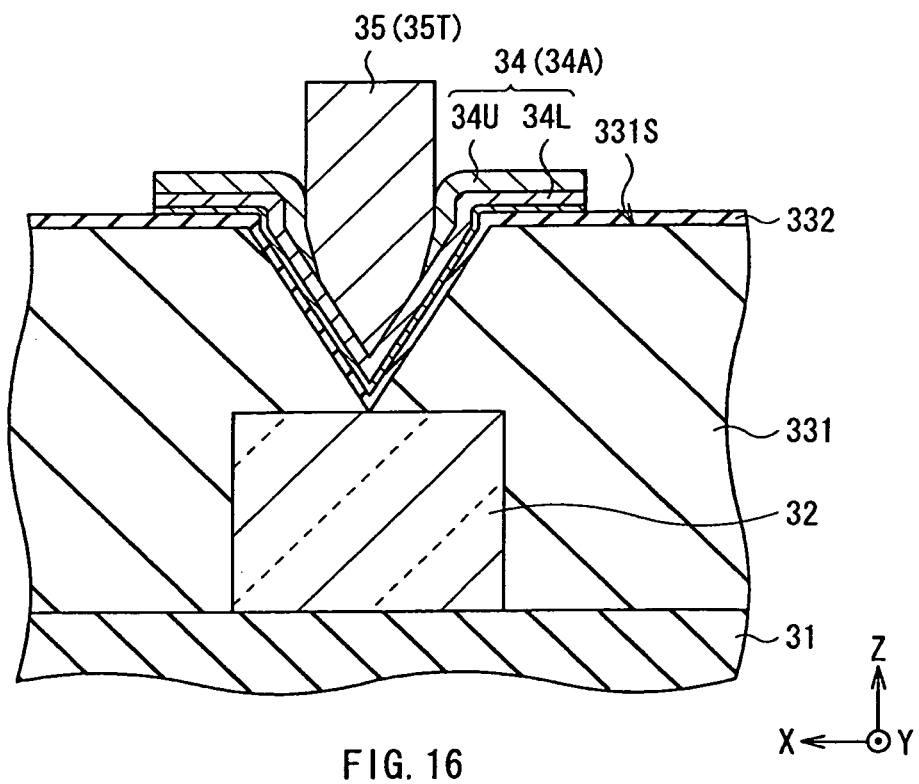
FIG. 16 is a sectional view for describing a process following the process of FIG. 15.

Finally, as illustrated in FIG. 16, for example, by plating, the magnetic pole 35 is formed to fill the V-shaped groove of (the first portion of) the plasmon generator 34. The magnetic pole 35 is preferably formed to have a width in X-axis direction narrower than the width of the mid-portion C34 of the first portion 34A. Consequently, the main part of the magnetic read write head 10 is completed.

[Control Circuit of Magnetic Disk Device]

Figure 17:
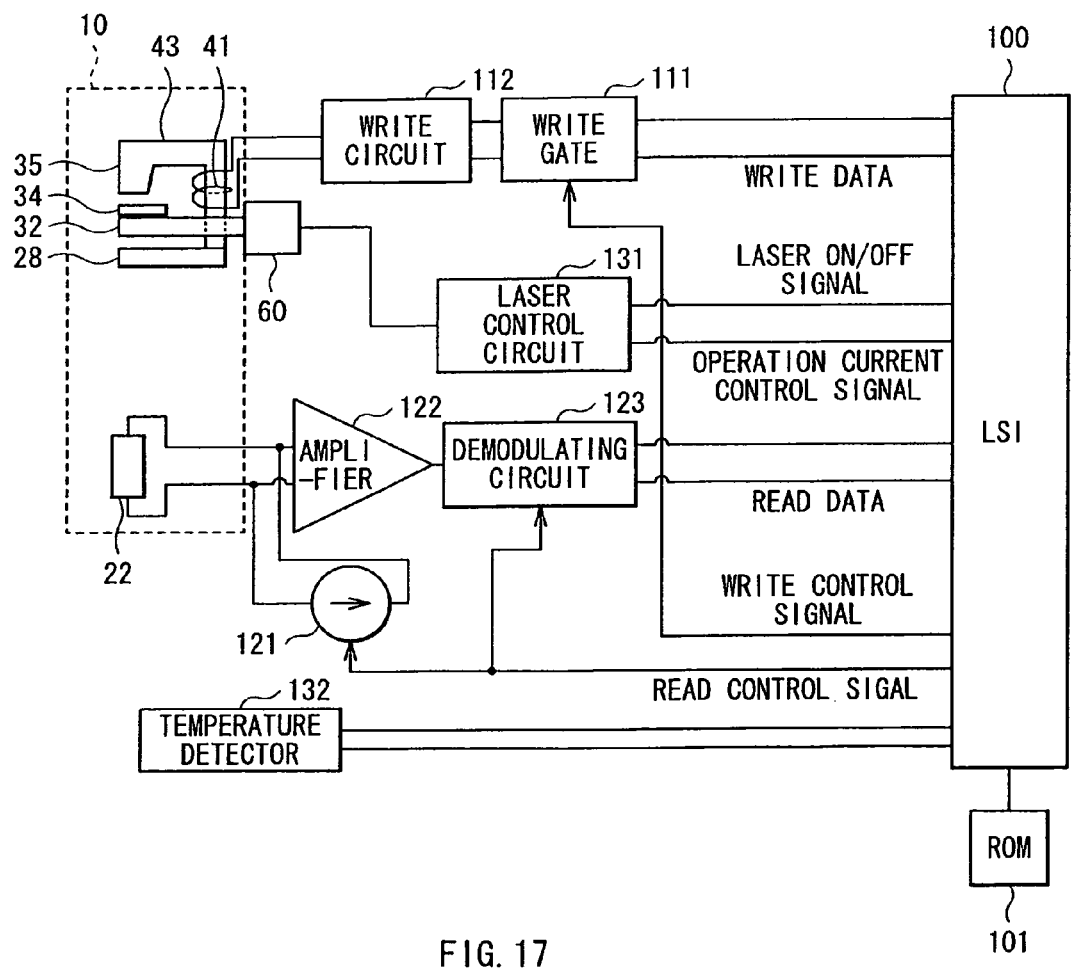
FIG. 17 is a block diagram illustrating a circuit configuration of the magnetic disk device illustrated in FIG. 1.

Referring to FIG. 17, the circuit configuration of the control circuit of the magnetic disk device illustrated in FIG. 1 and the operation of the magnetic read write head 10 are described. The control circuit is provided with a control LSI (large-scale integrated circuit) 100, a ROM (read only memory) 101 connected to the control LSI 100, a write gate 111 connected to the control LSI 100, and a write circuit 112 connecting the write gate 111 and the coil 41. The control circuit is further provided with a constant current circuit 121 connected to the MR element 22 and the control LSI 100, an amplifier 122 connected to the MR element 22, and a demodulating circuit 123 connected to an output end of the amplifier 122 and the control LSI 100. The control circuit is further provided with a laser control circuit 131 connected to the laser diode 60 and the control LSI 100, and a temperature detector 132 connected to the control LSI 100.

The control LSI 100 supplies write data and provides a write control signal to the write gate 111. Also, the control LSI 100 provides the constant current circuit 121 and the demodulating circuit 123 with a read control signal, and receives read data output from the demodulating circuit 123. In addition, the control LSI 100 provides the laser control circuit 131 with a laser ON/OFF signal and an operation current control signal.

The temperature detector 132 detects the temperature of the magnetic recording layer of the magnetic disk 2 to transmit temperature information to the control LSI 100.

The ROM 101 stores a control table and the like to control an operation current value which is supplied to the laser diode 60.

During the write operation, the control LSI 100 supplies the write gate 111 with the write data. The write gate 111 supplies the write data to the write circuit 112 only when the write control signal indicates the write operation. The write circuit 112 allows a write current to flow through the coil 41, based on the write data. As a result, the recording magnetic field is generated by the magnetic pole 35, and data is recorded in the magnetic recording layer of the magnetic disk 2 by this recording magnetic field.

During the read operation, the constant current circuit 121 supplies the MR element 22 with a constant sense current only when the read control signal indicates the read operation. An output voltage of the MR element 22 is amplified by the amplifier 122, and input to the demodulating circuit 123. When the read control signal indicates the read operation, the demodulating circuit 123 demodulates the output of the amplifier 122 to generate read data which is provided to the control LSI 100.

The laser control circuit 131 controls supply of the operation current to the laser diode 60, based on the laser ON/OFF signal, and controls a value of the operation current supplied to the laser diode 60, based on the operation current control signal. When the laser ON/OFF signal indicates ON operation, the operation current equal to or larger than an oscillation threshold value is supplied to the laser diode 60 by control of the laser control circuit 131. Therefore, laser light is emitted from the laser diode 60, and the emitted laser light propagates through the waveguide 32. Then, the near-field light NF (described later) is generated from the pointed edge 34G of the plasmon generator 34 to heat a part of the magnetic recording layer of the magnetic disk 2, and the coercivity of the part is accordingly lowered. At the time of recording, the part of the magnetic recording layer in which the coercivity is lowered is applied with the recording magnetic field generated by the magnetic pole 35. Thus, the recording of the data is performed.

The control LSI 100 determines the value of the operation current of the laser diode 60 with reference to a control table stored in the ROM 101, based on the temperature and the like of the magnetic recording layer of the magnetic disk 2, the temperature being determined by the temperature detector 132, and the control LSI 100 controls the laser control circuit 131 with use of the operation current control signal so that the operation current with the determined value is supplied to the laser diode 60. The control table includes, for example, the oscillation threshold value and data representing temperature dependence of light output-operation current property of the laser diode 60. The control table further may include data representing relationship between the operation current value and the increase amount of the temperature in the magnetic recording layer heated by the near-field light NF, or data representing temperature dependence of the coercivity in the magnetic recording layer.

The control circuit illustrated in FIG. 17 includes a signal system for controlling the laser diode 60, namely, a signal system including the laser ON/OFF signal and the operation current control signal, independent of the control signal system of the write/read operation. Therefore, the control circuit may achieve not only the electric conduction to the laser diode 60 simply linked with the recording operation, but also the electric conduction to the laser diode 60 of various modes.

Note that the configuration of the control circuit of the magnetic disk device is not limited to that illustrated in FIG. 17.

Figure 18:
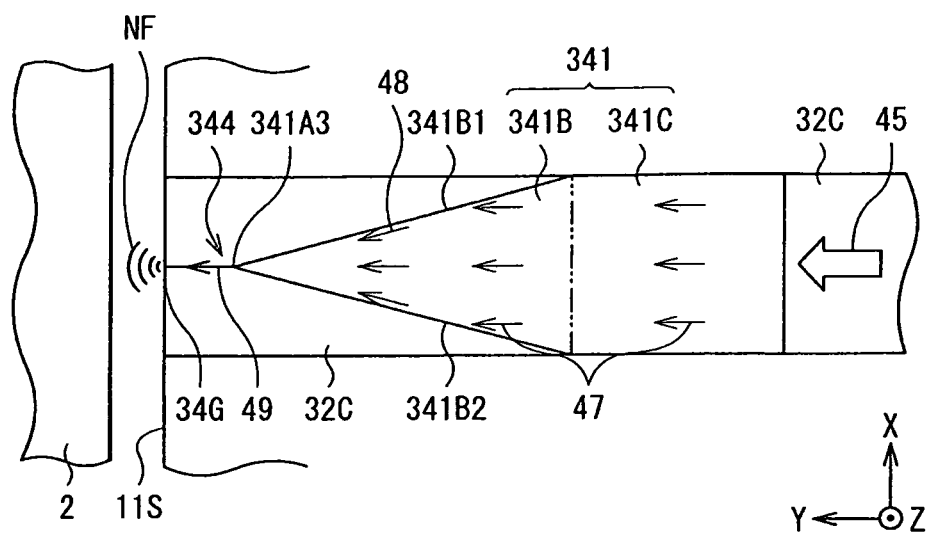
FIG. 18 is an explanatory diagram for describing an operation of the magnetic read write head.

Referring to FIG. 8 and FIG. 18, the principal of the near-field light generation and the principal of the heat-assisted magnetic recording with use of the near-field light according to the embodiment are described. FIG. 18 is, similar to FIG. 9, a plane view illustrating the positional relationship between the surface plasmon exciting surface 341 and the evanescent light generating surface 32C, and illustrates the plasmon generator 34 and the waveguide 32 viewed from the magnetic pole 35 side.

Laser light 45 emitted from the laser diode 60 propagates through the waveguide 32 to reach the vicinity of the plasmon generator 34. The laser light 45 is totally reflected by the evanescent light generating surface 32C that is an interface between the waveguide 32 and the buffer section 33A, and accordingly, evanescent light 46 (FIG. 8) leaking into the buffer section 33A is generated. After that, a surface plasmon polariton mode is induced by coupling the evanescent light 46 with charge fluctuation on the surface plasmon exciting surface 341 out of the outer surface of the plasmon generator 34. As a result, surface plasmons 47 (FIG. 18) are excited on the surface plasmon exciting surface 341. The surface plasmons 47 propagate on the surface plasmon exciting surface 341 toward the pointed edge 34G. The first surface 341A of the surface plasmon exciting surface 341 is configured so that the width thereof in X-axis direction becomes narrower toward the ABS 11S as described above. Accordingly, when propagating on the first surface 341A, the surface plasmons 47 are gradually converted into edge plasmons 48 (FIG. 18) as surface plasmons propagating along the edge rims 341A1 and 341A2, and the electric field intensity of the plasmons including the surface plasmons 47 and the edge plasmons 48 is increased. The surface plasmons 47 and the edge plasmons 48 are converted into edge plasmons 49 (FIG. 18) when reaching the edge 344, and the edge plasmons 49 propagate along the edge 344 toward the ABS 11S. The edge plasmons 49 eventually reach the pointed edge 34G. As a result, the edge plasmons 49 are collected at the pointed edge 34G to generate near-field light NF from the pointed edge 34G, based on the edge plasmons 49. The near-field light NF is irradiated toward the magnetic disk 2 and reaches the surface of the magnetic disk 2 to heat a part of the magnetic recording layer of the magnetic disk 2. As a result, the coercivity at the heated part of the magnetic recording layer is lowered. In the heat-assisted magnetic recording, with respect to the part of the magnetic recording layer with the coercivity thus lowered, data recording is performed by application of the recording magnetic filed generated by the magnetic pole 35.

It is considered that the following first and second principals lead to the increase of the electric field intensity of the plasmons on the first surface 341A. First, the description is made for the first principle. In the embodiment, on the metal surface of the surface plasmon exciting surface 341, the surface plasmons 47 are excited by the evanescent light 46 generated from the evanescent light generating surface 32C. The surface plasmons 47 propagate on the surface plasmon exciting surface 341 toward the pointed edge 34G. The wave number of the surface plasmons 47 propagating on the first surface 341A is gradually increased with decreasing the width of the first surface 341A in X-axis direction, that is, toward the ABS 11S. As the wave number of the surface plasmons 47 is increased, the propagating speed of the surface plasmons 47 becomes slower. As a result, the energy density of the surface plasmons 47 is increased to increase the electric field intensity of the surface plasmons 47.

Next, the description is made for the second principle. When the surface plasmons 47 propagate on the surface plasmon exciting surface 341 toward the pointed edge 34G, a part of the surface plasmons 47 collide with the edge rims 341A1 and 341A2 of the first surface 341A and is scattered, and accordingly a plurality of plasmons with different wave number are generated. A part of the plurality of the plasmons thus generated is converted into the edge plasmons 48 whose wave number is larger than that of the surface plasmons propagating on the plane. In such a way, the surface plasmons 47 are gradually converted into the edge plasmons 48 propagating along the edge rims 341A1 and 341A2, and accordingly, the electric field intensity of the edge plasmons 48 is gradually increased. In addition, the edge plasmons 48 have a larger wave number and slower propagating speed compared with the surface plasmons propagating on the plane. Therefore, the surface plasmons 47 are converted into the edge plasmons 48 to increase the energy density of the plasmons. Further, on the first surface 341A, the surface plasmons 47 are converted into the edge plasmons 48 as described above, and new surface plasmons 47 are also generated based on the evanescent light 46 emitted from the evanescent light generating surface 32C. The new surface plasmons 47 are also converted into the edge plasmons 48. In this way, the electric field intensity of the edge plasmons 48 is increased. The edge plasmons 48 are converted into the edge plasmons 49 propagating through the edge 344. Therefore, the edge plasmons 49 are obtainable which have the increased electric field intensity compared with the surface plasmons 47 at the beginning of generation.

In the embodiment, on the first surface 341A, the surface plasmons 47 propagating on the plane coexist with the edge plasmons 48 whose wave number is larger than that of the surface plasmons 47. It is considered that, on the first surface 341A, the increase of the electric field intensity of both the surface plasmons 47 and the edge plasmons 48 occurs due to the first and second principals described above. Accordingly, in the embodiment, compared with a case where one of the first and second principals is effective, the electric field intensity of the plasmons may be further increased.

[Effects of Magnetic Read Write Head and Magnetic Disk Device]

In the embodiment, as described above, the first portion 34A of the plasmon generator 34 having the front end surface 342 which is exposed at the ABS 11S has a minimum thickness at a portion including pointed edge 34G which is positioned close to the waveguide 32. Therefore, the magnetic pole 35 and the pointed edge 34G are closely located on the ABS 11S. On the other hand, on the first portion 34A, the thickness of a part apart from the pointed edge 34G is increased to improve the efficiency of heat dissipation. Accordingly, compared with a case where the first portion 34A has an uniform thickness, while the efficiency and precision of the heat-assisted magnetic recording are improved, the increase of temperature in the magnetic pole 35 and in the vicinity thereof are suppressed. In addition, occurrence of corrosion of the magnetic pole 35 and of defect of the structure in the vicinity of the magnetic pole 35 may be prevented. As a result, while securing the long-time reliability, the recording operation may be achieved with increased efficiency and stability.

Further, in the embodiment, the magnetic pole 35 is in contact with the mid-portion C34 of the plasmon generator 34, and in X-axis direction, the magnetic pole 35 has a width smaller than that of the waveguide 32 and of the mid-portion C34. With such a configuration, the recording magnetic field generated from the magnetic pole 35 may have a distribution with steeper shape. As a result, the maximum intensity of the recording magnetic field necessary for information recording may be further increased. Further, the mid-portion C34 has a minimum thickness at the pointed edge 34G, and in X-axis direction, the thickness is increased with increasing distance from the pointed edge 34G. With such a configuration, the maximum intensity of the recording magnetic field generated from the magnetic pole 35 may be further increased. In addition, the interface between the magnetic pole 35 and the first portion 34A is a smooth curved-surface, and therefore the magnetic flux is prevented from leaking into adjacent tracks.

EXAMPLES

Examples of the embodiment of the invention are described in detail.

Example 1

In Example 1, the magnetic read write head 10 as the above-described embodiment illustrated in FIGS. 2 to 7 and the like was manufactured according to the manufacturing method described in the above-described embodiment. Here, the dimensional ratio of the components in the ABS 11S were as follows. When the width of the waveguide 32 in X-axis direction was 1 (500 nm), the width of each of the mid-portion C34 and the wing portion W34 of the first portion 34A was 0.7 and 18, the thickness of the lower layer 34L was 0.1, the maximum thickness of the upper layer 34U was 0.4, the maximum width of the magnetic pole 35 was 0.7, the thickness of the magnetic pole 35 was 2, and the distance between the pointed edge 34G and the waveguide 32 in Z-axis direction was 0.07 (refer to FIG. 5).

Example 2

Figure 19:
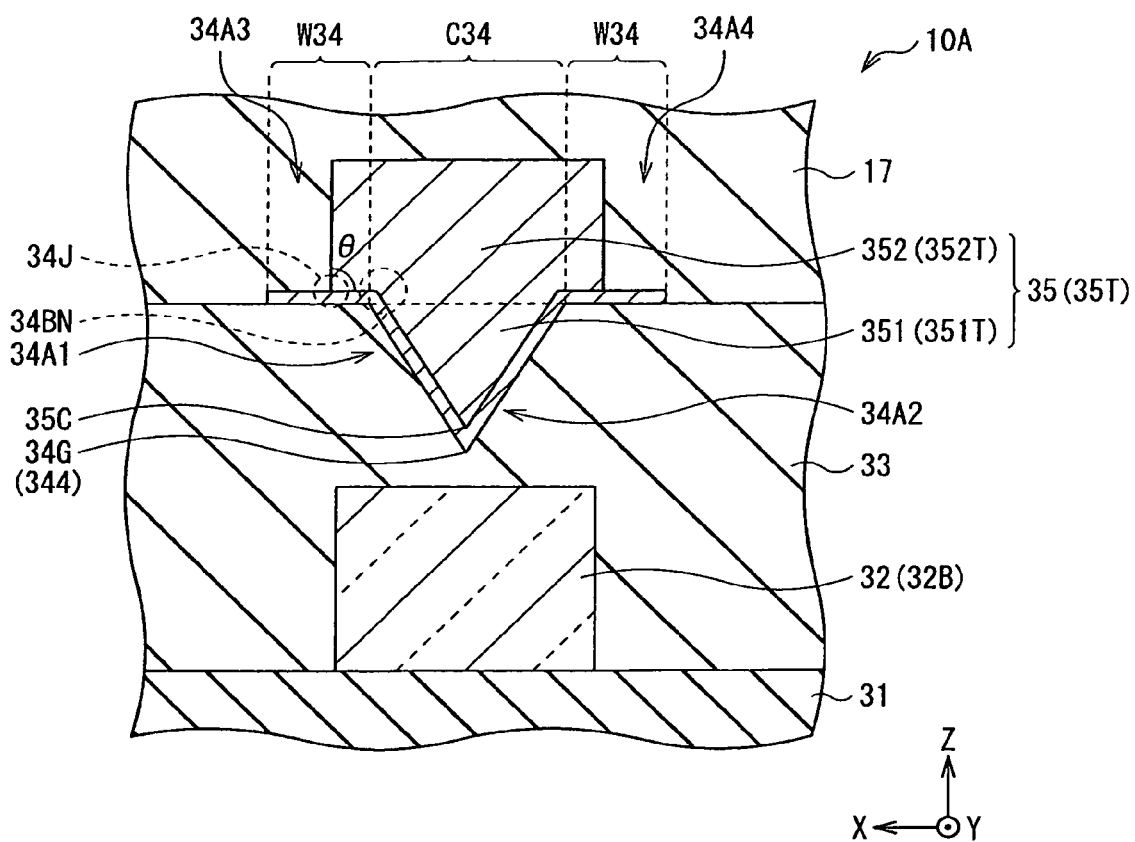
FIG. 19 is a plane view illustrating a configuration of an end surface exposed at the air bearing surface, of a magnetic read write head corresponding to Example 2.

In Example 2, except that having a sectional surface shape illustrated in FIG. 19, the magnetic read write head 10A having the same structure as that of Example 1 was manufactured according to the manufacturing method described in the above-described embodiment. Specifically, in the magnetic read write head 10A, the plasmon generator 34 was configured by only a portion corresponding to the lower layer 34L in the magnetic read write head 10A, and the width of the second layer 352 of the magnetic pole 35 was larger than that of the waveguide 32. More specifically, when the width of the waveguide 32 was 1 (500 nm), the width of the second layer 352 of the magnetic pole 35 was 2. Therefore, the second layer 352 of the magnetic pole 35 was formed to cover also a part of the wing portions W34 of the plasmon generator 34, and the bending portion 34 BN is formed at the interface between the plasmon generator 34 and the magnetic pole 35. In addition, the relative angle θ at the intersection 34J between the side surface of the second layer 352 and the surface of the plasmon generator 34 was 90°.

Example 3

Figure 20:
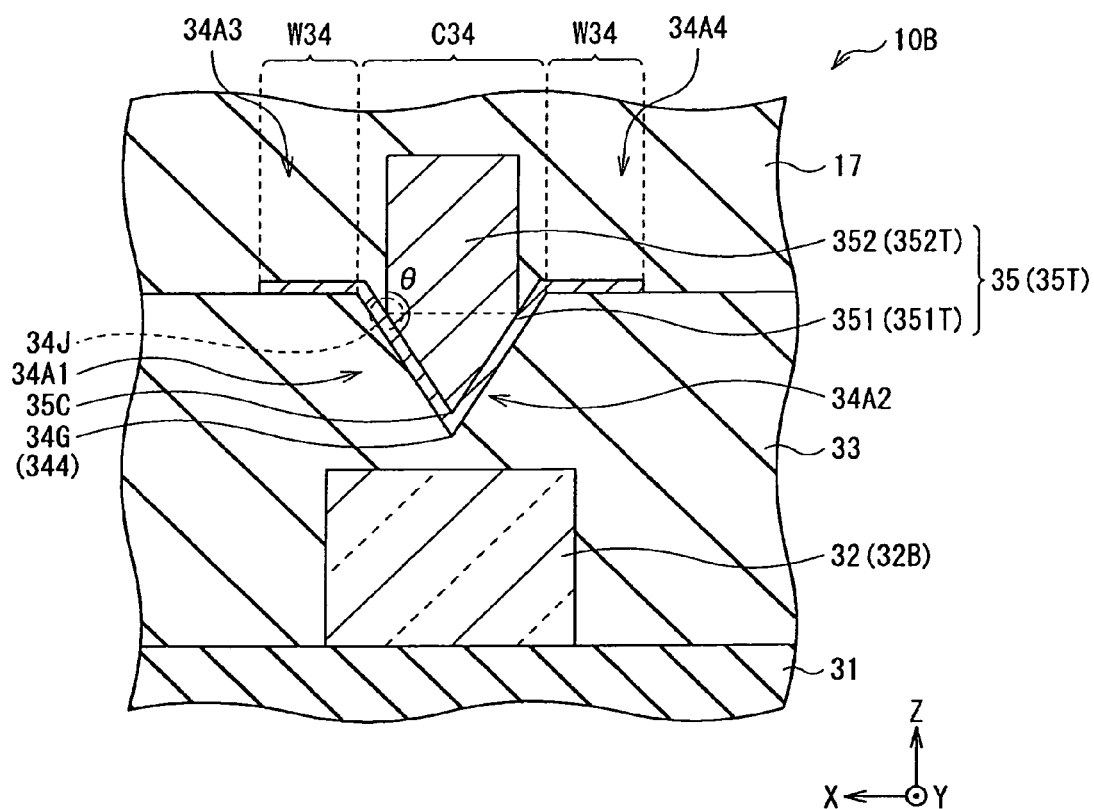
FIG. 20 is a plane view illustrating a configuration of an end surface exposed at the air bearing surface, of a magnetic read write head corresponding to Example 3.

In Example 3, except that having a sectional surface shape illustrated in FIG. 20, the magnetic read write head 10B having the same structure as that of Example 1 was manufactured according to the manufacturing method described in the above-described embodiment. Specifically, in the magnetic read write head 10B, the plasmon generator 34 was configured by only a portion corresponding to the lower layer 34L in the magnetic read write head 10A.

The magnetic read write heads 10, 10A, and 10B of Examples 1 to 3 thus manufactured were used to perform heat-assisted magnetic recording into a magnetic disk, and the intensity distribution of the recording magnetic field applied to the magnetic disk at that time was examined. The results are illustrated in FIG. 21 and FIG. 22.

FIGS. 21A to 21C correspond to the magnetic read write head 10, 10A, and 10B of Examples 1 to 3, respectively, and each illustrate the intensity distribution of the recording magnetic field applied to the surface of the magnetic disk in the direction across write tracks (X-axis direction). In FIGS. 21A to 21C, the horizontal axis indicates a position in the direction across write tracks (with the pointed edge 34G being 0 point), and the horizontal axis indicates relative intensity of the recording magnetic field (with the maximum peak intensity of Example 1 being 1).

Figure 22:
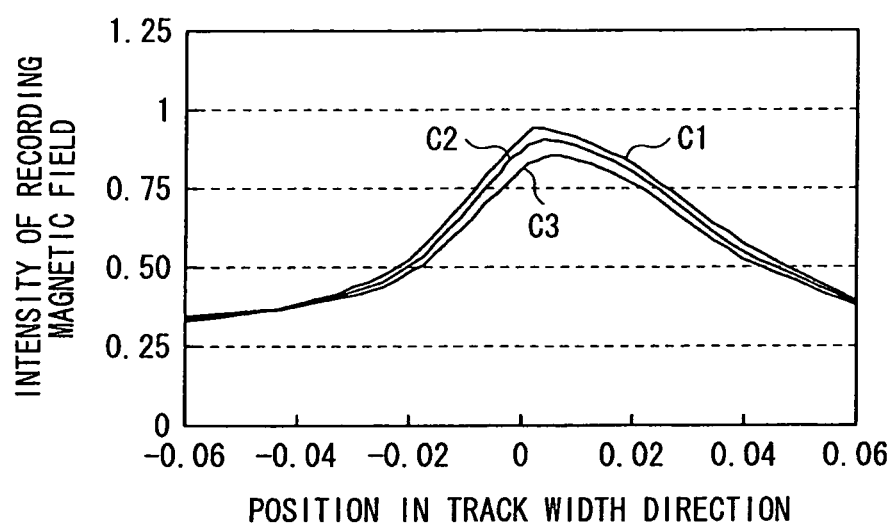
FIG. 22 is a characteristic diagram illustrating intensity distribution of recording magnetic field on a section surface including pointed edge along a write track direction.

Moreover, FIG. 22 illustrates intensity distribution of the recording magnetic field applied to the surface of the magnetic disk in a section surface including the pointed edge 34G along a write track direction (Z-axis direction). In FIG. 22, the horizontal axis indicates a position in the write track direction (with the pointed edge 34G being 0 point), and the vertical axis indicates relative intensity of the recording magnetic field (with the maximum peak intensity of Example 1 being 1). Curbed lines C1 to C3 in FIG. 22 correspond to Examples 1 to 3, respectively.

Figure 21:
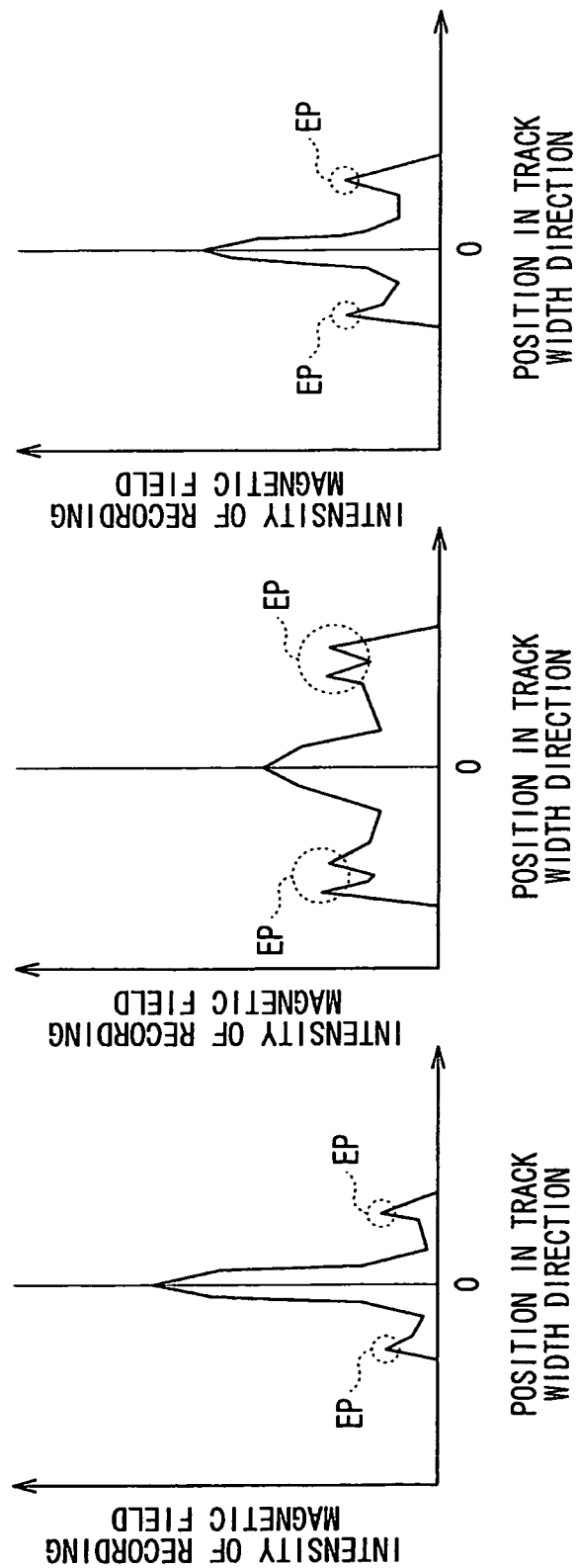
FIG. 21A is a characteristic diagram illustrating intensity distribution of recording magnetic field in a direction across write tracks in Example 1.
FIG. 21B is a characteristic diagram illustrating intensity distribution of recording magnetic field in a direction across write tracks in Example 2.
FIG. 21C is a characteristic diagram illustrating intensity distribution of recording magnetic field in a direction across write tracks in Example 3.

As is obvious from the results in FIG. 21 and FIG. 22, the recording magnetic field exhibited the highest maximum intensity in Example 1, and exhibited the lowest maximum intensity in Example 2. In addition, in FIG. 21A to 21C, although undesirable edge peaks EP of the intensity of the recording magnetic field were generated at positions corresponding to the intersections 34J in all Examples, the height of the edge peaks EP was allowed to be lowest in Example 1. This was caused that, in Example 1, the plasmon generator 34 had a two-layer structure including the lower layer 34L and the upper layer 34U, and the thickness of the plasmon generator 34 was increased at a position away from the pointed edge 34G. In other words, it is considered that since the first layer 351 of the magnetic pole 35 had a sharper shape, and the angle θ between the side surface of the second layer 352 and the side surface of the first layer 351 was increased, the leakage of the magnetic flux from the intersection 3J was reduced (refer to FIG. 5).

Further, in Examples 1 to 3 described above, at the time of performing the heat-assisted magnetic recording, corrosion and transformation did not occur in the magnetic pole 35, the clad layer 33, and the like.

From the results of Examples 1 to 3, it was confirmed that the heat-assisted magnetic recording was achievable with higher efficiency and stability by providing distribution to the thickness of a plasmon generator as in Example 1.

Although the present invention has been described with the embodiment, the present invention is not limited to the embodiment described above, and various modifications may be made. For example, in the embodiment, although exemplified is a CPP-type GMR element as a read element, the read element is not limited thereto and may be a CIP (current in plane)—GMR element. In this case, an insulating layer needs to be provided between an MR element and a lower shield layer, and between the MR element and an upper shield layer, and a pair of leads for supplying a sense current to the MR element needs to be inserted into the insulating layer. Alternatively, a TMR (tunneling magnetoresistance) element with a tunnel junction film may be used as a read element.

Figure 23:
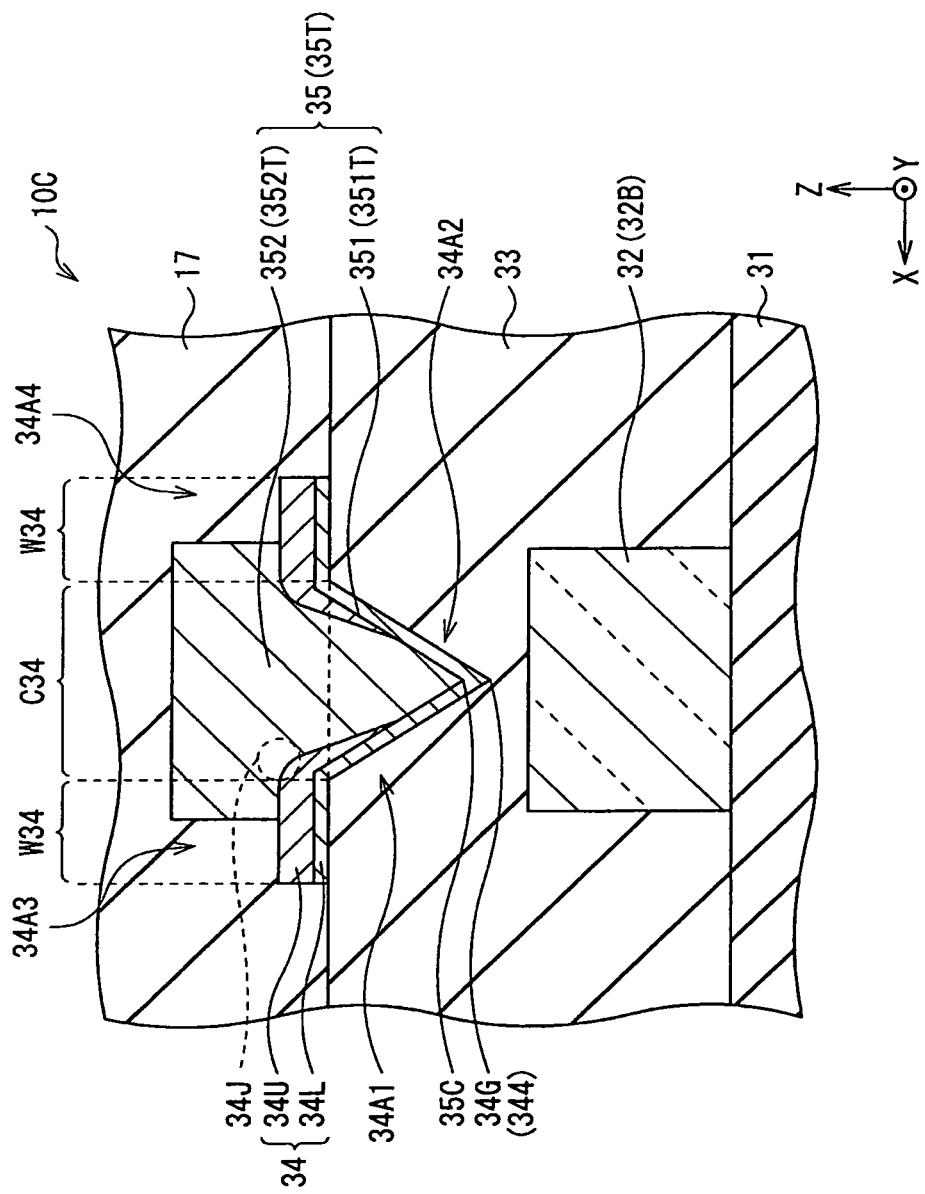
FIG. 23 is a plane view illustrating a configuration of an end surface exposed at the air bearing surface, of a magnetic read write head in Modification.

In the embodiment as described above, although the magnetic pole has a width narrower than that of the V-shaped mid-portion of the plasmon generator, the present invention is not limited thereto. For example, as the magnetic read write head 10C illustrated in FIG. 23, the width of the second layer 352 of the magnetic pole 35 may be larger than that of the waveguide 32. Even in such a case, since performance of the heat dissipation is improved compared with a case where the plasmon generator has a uniform thickness, recording operation with stability is achievable for a long time.

Furthermore, in the above-described embodiment, when the upper layer of the plasmon generator is manufactured, a lift-off method which uses a resist pattern of two layers as a mask is employed. However, the present invention is not limited thereto. For example, a lift-off method which uses a suspension bridge configured of a hollow beam as a mask may be employed. In addition, without using a mask such as resist pattern, sputtering may be performed directly on the lower layer from a predetermined angle.

The correspondence relationship between the reference numerals and the components of the embodiment is collectively illustrated here. 1 . . . housing, 2 . . . magnetic disk, 3 . . . head arm assembly (HAA), 4 . . . head gimbals assembly (HGA), 4A . . . slider, 4B . . . suspension, 5 . . . arm, 6 . . . drive section, 7 . . . fixed shaft, 8 . . . bearing, 9 . . . spindle motor, 10 . . . magnetic read write head, 11 . . . substrate, 11A . . . element forming surface, 11S . . . air bearing surface (ABS), 13 . . . insulating layer, 14 . . . read head section, 16 . . . write head section, 17 . . . protective layer, 21 . . . lower shield layer, 22 . . . MR element, 23 . . . upper shield layer, 24, 25, 27, 38, 39, 42 . . . insulating layers, 28 . . . lower yoke layer, 29 . . . leading shield, 30, 36, 37 . . . connecting layers, 31, 33 . . . clad layers, 32 . . . waveguide, 34 . . . plasmon generator, C34 . . . mid-portion, W34 . . . wing portion, 34A to 34C . . . first to third portions, 34G . . . pointed edge, 34L . . . lower layer, 34U . . . upper layer, 341 . . . surface plasmon exciting surface, 344 . . . edge, 35 . . . magnetic pole, 351 . . . first layer, 352 . . . second layer, 40A, 40B . . . connecting sections, 41 . . . coil, 43 . . . upper yoke layer, 45 . . . laser light, 46 . . . evanescent light, 47 . . . surface plasmon, 48, 49 . . . edge plasmons, 50 . . . light source unit, 51 . . . supporting member, 60 . . . laser diode, 61 . . . lower electrode, 62 . . . active layer, 63 . . . upper electrode, 64 . . . reflecting layer, 65 . . . n-type semiconductor layer, 66 . . . p-type semiconductor layer, NF . . . near-field light.

What is claimed is:

1. A heat-assisted magnetic write head comprising:
a magnetic pole having an end surface exposed at an air bearing surface;
a waveguide extending toward the air bearing surface to propagate light; and
a plasmon generator provided between the magnetic pole and the waveguide, and generating near-field light from the air bearing surface, based on the light propagated through the waveguide;
wherein the plasmon generator has an end portion exposed at the air bearing surface or located in close proximity to the air bearing surface, the end portion having a minimum thickness in a region close to the waveguide.

2. The heat-assisted magnetic write head according to claim 1, wherein the end portion of the plasmon generator has a V-shaped mid-portion including a pointed edge projected toward the waveguide, and has a couple of wing portions disposed with the mid-portion in between in a direction across write tracks.

3. The heat-assisted magnetic write head according to claim 2, wherein the magnetic pole is in contact with the mid-portion of the plasmon generator.

4. The heat-assisted magnetic write head according to claim 3, wherein thickness of the mid-portion is minimal in a region including the pointed edge, and increases along with increasing distance from the pointed edge in the direction across write tracks.

5. The heat-assisted magnetic write head according to claim 4, wherein the end surface of the magnetic pole has a width smaller than that of the mid-portion in the direction across write tracks.

6. The heat-assisted magnetic write head according to claim 1, wherein the plasmon generator includes one or more selected from a group consisting of Ag (silver), Cu (copper), Au (gold), Al (aluminum), W (tungsten), Si (silicon), Ir (iridium), Mo (molybdenum), Zn (zinc), Ru (ruthenium), Co (cobalt), Ni (nickel), Cr (chromium), Fe (iron), Pt (platinum), Rh (rhodium), Sn (tin), Ta (tantalum), Nb (niobium), Diamond, AlN (aluminum nitride), SiC (silicon carbide), SiAlN, and BN (boron nitride).

7. A head gimbals assembly comprising:
a magnetic head slider having a side surface provided with the heat-assisted magnetic write head according to claim 1; and
a suspension having an end portion provided with the magnetic head slider.

8. A head arm assembly comprising:
a magnetic head slider having a side surface provided with the heat-assisted magnetic write head according to claim 1;
a suspension having an end portion provided with the magnetic head slider; and
an arm supporting other end of the suspension.

9. A magnetic disk device including a magnetic recording medium and a head arm assembly, the head arm assembly comprising:
a magnetic head slider having a side surface provided with the heat-assisted magnetic write head according to claim 1;
a suspension having an end portion provided with the magnetic head slider; and
an arm supporting other end of the suspension.

* * * * *